(12) United States Patent
Kanamura et al.

(10) Patent No.: US 8,309,257 B2
(45) Date of Patent: Nov. 13, 2012

(54) METHOD FOR PRODUCING SOLID ELECTROLYTE STRUCTURE WITH POROUS PORTION AND DENSE PORTION

(75) Inventors: Kiyoshi Kanamura, Hachioji (JP); Masanori Hara, Hachioji (JP); Sayaka Okuda, Hachioji (JP); Kazuhiro Yamamoto, Nagoya (JP); Yosuke Sato, Hashima-Gun (JP)

(73) Assignees: Tokyo Metropolitan University, Shinjuku-Ku (JP); NGK Insulators, Ltd., Nagoya (JP)

( * ) Notice: Subject to any disclaimer, the term of this patent is extended or adjusted under 35 U.S.C. 154(b) by 922 days.

(21) Appl. No.: 12/399,209

(22) Filed: Mar. 6, 2009

(65) Prior Publication Data

US 2009/0226790 A1    Sep. 10, 2009

(30) Foreign Application Priority Data

Mar. 7, 2008  (JP) ................................. 2008-057753
Feb. 17, 2009  (JP) ................................. 2009-034371

(51) Int. Cl.
*H01M 6/14*    (2006.01)

(52) U.S. Cl. ........ 429/304; 429/188; 429/189; 429/319; 429/322

(58) Field of Classification Search ................... 429/188, 429/189, 304, 319, 322
See application file for complete search history.

(56) References Cited

U.S. PATENT DOCUMENTS

| | | | |
|---|---|---|---|
| 4,439,502 A | | 3/1984 | Bittihn et al. |
| 4,985,317 A | * | 1/1991 | Adachi et al. .................. 429/322 |
| 2003/0099884 A1 | | 5/2003 | Chiang et al. |
| 2007/0154762 A1 | * | 7/2007 | Schucker ....................... 429/33 |

FOREIGN PATENT DOCUMENTS

| | | |
|---|---|---|
| EP | 1926164 | 5/2008 |
| JP | 2000-311710 A1 | 11/2000 |
| JP | 2005-063958 A1 | 3/2005 |
| JP | 2006-260887 A1 | 9/2006 |
| JP | 2006260887 A  * | 9/2006 |
| WO | 2008/059987 A1 | 5/2008 |

OTHER PUBLICATIONS

Masanori Hara, et al., "Fabrication of all Solid-State Lithium-Ion Batteries with Three-Dimensionally Ordered Composite Electrode Consisting of $Li_{0.35}La_{0.55}TiO_3$ and $LiMn_2O_4$," Journal of Power Sources, 189, 2009, pp. 485-489.

Hiroyuki Nakano, et al., "Three-Dimensionally Ordered Composite Electrode Between $LiMn_2O_4$ and $Li_{1.5}Al_{0.5}Ti_{1.5}(PO_4)_3$," Ionics, 2008, 14:173-177.

U.S. Appl. No. 12/399,219, filed Mar. 6, 2009, Kanamura et al.

* cited by examiner

*Primary Examiner* — Zachary Best
(74) *Attorney, Agent, or Firm* — Burr & Brown

(57) ABSTRACT

A first fine particle-containing solution is deposited on an appropriate substrate, and dried to form a first fine particle aggregate layer. Polymer particles are deposited on the first fine particle aggregate layer, and are supplied with a second fine particle-containing solution such that the polymer particles are immersed in the second fine particle-containing solution. The second fine particle-containing solution is dried to form a second fine particle aggregate layer containing a large number of the polymer particles embedded. A first structure precursor is completed at this stage. Then, the first structure precursor is separated from the substrate, and thermally treated. Thus, the production of a first solid electrolyte structure, which has a porous solid electrolyte portion and a dense solid electrolyte portion integrated, is completed.

9 Claims, 25 Drawing Sheets

METHOD FOR PRODUCING SOLID ELECTROLYTE STRUCTURE WITH POROUS PORTION AND DENSE PORTION

CROSS-REFERENCE TO RELATED APPLICATIONS

This application is based upon and claims the benefit of priority from Japanese Patent Application No. 2008-057753 filed on Mar. 7, 2008 and Japanese Patent Application No. 2009-034371 filed on Feb. 17, 2009 in the Japanese Patent Office, of which the contents are incorporated herein by reference.

FIELD OF THE INVENTION

The present invention relates to a method for producing a solid electrolyte structure usable as a base of an all-solid-state cell utilizing a combination of a cell active material and a solid electrolyte (a production method of a solid electrolyte structure), a method for producing an all-solid-state cell using the solid electrolyte structure (a production method of an all-solid-state cell), a solid electrolyte structure, and an all-solid-state cell.

BACKGROUND OF THE INVENTION

In recent years, with the development of portable devices such as personal computers and mobile phones, there has been rapidly increasing demand for batteries usable as a power source thereof. In cells of the batteries for the purposes, a liquid electrolyte (an electrolytic solution) containing a combustible organic diluent solvent has been used as an ion transfer medium. The cell using such an electrolytic solution can cause problems of solution leakage, ignition, explosion, etc.

In view of solving the problems, all-solid-state cells, which use a solid electrolyte instead of the liquid electrolyte and contain only solid components to ensure intrinsic safety, have been developed. The all-solid-state cell contains a sintered ceramic as the solid electrolyte, and thereby does not cause the problems of ignition and liquid leakage, and is hardly deteriorated in battery performance by corrosion. Particularly all-solid-state lithium secondary cells can achieve a high energy density easily, and thus have been actively studied in various fields.

In general, the all-solid-state cell is experimentally produced by applying a cell active material to a plane surface of the solid electrolyte and by firing the resultant to form an electrode. In this production, the connection area between the solid electrolyte and the cell active material does not exceed the plane area of the cell. The connection area is practically the total of contact areas between particles of the solid electrolyte and the cell active material, and thereby is generally smaller than the surface area of the electrode, resulting in a high resistance against charge transfer between the solid electrolyte and the cell active material.

In view of increasing the contact area between the solid electrolyte and the cell active material, thereby lowering the charge transfer resistance therebetween, for example, an all-solid-state secondary lithium cell having a composite electrode formed by filling pores of a porous solid electrolyte with a cell active material is disclosed in Japanese Laid-Open Patent Publication No. 2006-260887, etc.

More specifically, the all-solid-state secondary lithium cell is obtained by filling pores of a porous solid electrolyte having a lithium ion conductivity of $0.5 \times 10^{-4}$ S/cm or more with a cell active material capable of acting as a positive or negative electrode material in the cell, thereby forming a secondary lithium cell electrode composed of a composite of the porous solid electrolyte and the cell active material, and by connecting an electrolyte and a counter electrode thereto.

Such a cell has a contact interface area between the solid electrolyte and the cell active material equal to the surface area of the porous body, and thereby has a charge transfer resistance lower than that of the cell produced by applying the cell active material to a plane surface of the solid electrolyte.

However, the secondary lithium ion cell described in Japanese Laid-Open Patent Publication No. 2006-260887 has the following disadvantages since the further electrolyte has to be connected to the composite electrode composed of the porous solid electrolyte and the cell active material.

(a) When the composite electrode and the electrolyte are insufficiently connected, the connection interface may have a high resistance.

(b) The production of the cell requires the additional process of connecting the composite electrode and the electrolyte.

To form the connection interface satisfactorily, it is necessary to integrate the composite electrode and a dense body of the electrolyte by continuously applying a high pressure or by another process such as sintering. However, the porous composite electrode has a brittle structure, and has the following disadvantages.

(c) The composite electrode cannot be easily handled in the process of pressurization or sintering.

(d) The composite electrode is often cracked in the process of pressurization or sintering.

Particularly, when the composite electrode and the electrolyte have small thicknesses for lowered cell resistance, the problems of (c) and (d) are quite often caused in the integration.

SUMMARY OF THE INVENTION

In view of the above problems, an object of the present invention is to provide a solid electrolyte structure production method and an all-solid-state cell production method that are capable of integrating a porous solid electrolyte and a dense solid electrolyte with an excellent connection interface and do not require an additional process of connecting a solid electrolyte to a porous solid electrolyte portion of a composite electrode by pressurization, sintering, etc.

Another object of the present invention is to provide a solid electrolyte structure and an all-solid-state cell that contain the porous solid electrolyte and the dense solid electrolyte in the integrated state with the excellent connection interface.

According to a first aspect of the present invention, there is provided a method for producing a solid electrolyte structure, comprising a precursor preparation process of preparing a structure precursor and a structure production process of sintering the structure precursor to produce the solid electrolyte structure, wherein the precursor preparation process comprises the steps of depositing a fine particle aggregate layer containing aggregated fine particles of a solid electrolyte, and depositing another fine particle aggregate layer containing polymer particles and aggregated fine particles of a solid electrolyte, and the structure production process comprises the step of sintering the structure precursor, thereby removing the polymer particles to produce the solid electrolyte structure having a porous solid electrolyte portion and a dense solid electrolyte portion in the integrated state.

In the first aspect, in the step of depositing the another fine particle aggregate layer containing polymer particles and aggregated fine particles of a solid electrolyte, the polymer particles may be deposited and then immersed in a solution containing the fine particles of the solid electrolyte.

In the first aspect, in the step of depositing the other fine particle aggregate layer containing polymer particles and aggregated fine particles of a solid electrolyte, the other fine particle aggregate layer may be deposited on a nonwoven fabric.

In the first aspect, the precursor preparation process may comprise the steps of depositing a first fine particle aggregate layer containing aggregated fine particles of a solid electrolyte, and depositing a second fine particle aggregate layer containing polymer particles and aggregated fine particles of a solid electrolyte on the first fine particle aggregate layer.

In the first aspect, the precursor preparation process may comprise the steps of depositing a first fine particle aggregate layer containing polymer particles and aggregated fine particles of a solid electrolyte, depositing a second fine particle aggregate layer containing aggregated fine particles of a solid electrolyte on the first fine particle aggregate layer, and depositing a third fine particle aggregate layer containing polymer particles and aggregated fine particles of a solid electrolyte on the second fine particle aggregate layer.

According to a second aspect of the present invention, there is provided a method for producing a solid electrolyte structure, comprising a precursor preparation process of preparing a structure precursor and a structure production process of sintering the structure precursor to produce the solid electrolyte structure, wherein the precursor preparation process comprises the steps of depositing polymer particles and a sol solution of a precursor of a solid electrolyte, and gelation of the sol solution, and the structure production process comprises the step of sintering the structure precursor, thereby removing the polymer particles to produce the solid electrolyte structure having a porous solid electrolyte portion and a dense solid electrolyte portion in the integrated state.

In the second aspect, in the step of depositing the polymer particles and the sol solution of the solid electrolyte precursor, the polymer particles may be deposited and then immersed in the sol solution of the solid electrolyte precursor.

In the second aspect, in the step of depositing the polymer particles and the sol solution of the solid electrolyte precursor, the polymer particles and the sol solution may be deposited on a nonwoven fabric.

In the second aspect, in the precursor preparation process, the sol solution may be deposited such that the surface of the sol solution is positioned above the top of the polymer particles.

In the second aspect, the precursor preparation process may comprise the steps of depositing the polymer particles on a nonwoven fabric, and filling the nonwoven fabric and a gap between the polymer particles deposited thereabove with the sol solution such that the nonwoven fabric and the polymer particles are immersed in the sol solution.

In the second aspect, the precursor preparation process may comprise the steps of depositing the polymer particles, placing a nonwoven fabric on the polymer particles, depositing the polymer particles on the nonwoven fabric, and filling the nonwoven fabric and a gap between the polymer particles deposited thereabove and therebelow with the sol solution such that the nonwoven fabric and the polymer particles are immersed in the sol solution.

In the first and second aspects, the polymer particles may comprise a polystyrene or a polymethyl methacrylate (PMMA).

In the first and second aspects, the solid electrolyte is not particularly limited, and may comprise an LAGP ($Li_{1+x}Al_xGe_{2-x}(PO_4)_3$, $0 \leq x \leq 1$), an LATP ($Li_{1+x}Al_xTi_{2-x}(PO_4)_3$, $0 \leq x \leq 1$), an LLT ($Li_{3x}La_{2/3-x}TiO_3$, $0 \leq x \leq 2/3$), or an aluminum (Al)-containing ceramic material having a garnet-type or garnet-like-type crystal structure containing lithium (Li), lanthanum (La), zirconium (Zr), and oxygen (O).

In the first and second aspects, in the structure production process, a pressure may be applied to the structure precursor.

According to a third aspect of the present invention, there is provided a method for producing an all-solid-state cell, comprising the steps of filling the porous solid electrolyte portion of the solid electrolyte structure produced by a method according to the first or second aspect with a cell active material, and forming a counter electrode on the surface of the solid electrolyte structure, opposite to the surface provided with the porous solid electrolyte portion, to produce the all-solid-state cell.

According to a fourth aspect of the present invention, there is provided a method for producing an all-solid-state cell, comprising the step of filling the porous solid electrolyte portion of the solid electrolyte structure produced by a method according to the first or second aspect with a cell active material to produce the all-solid-state cell.

According to a fifth aspect of the present invention, there is provided a solid electrolyte structure produced by a method according to the first or second aspect.

According to a sixth aspect of the present invention, there is provided an all-solid-state cell produced by a method according to the third or fourth aspect.

As described above, by using the solid electrolyte structure production method and the all-solid-state cell production method of the present invention, the porous solid electrolyte portion and the dense solid electrolyte portion can be integrated. Thus, the present invention has the following advantageous effects.

(1) An excellent connection interface can be formed between the porous solid electrolyte portion and the dense solid electrolyte portion to lower the connection interface resistance.

(2) The additional process of connecting a solid electrolyte to the porous solid electrolyte portion of the composite electrode by pressurization, sintering, etc. is not required, whereby the production steps can be simplified and reduced.

(3) Since the above additional connecting process is not required, it is not necessary to use the solid electrolyte difficult to handle, and the number of processes of handling the solid electrolyte can be reduced.

The solid electrolyte structure and the all-solid-state cell of the present invention contain the porous solid electrolyte portion and the dense solid electrolyte portion in the integrated state with the excellent connection interface.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE INVENTION

An embodiment of the solid electrolyte structure production method and the all-solid-state cell production method of the present invention will be described below with reference to FIGS. 1 to 25.

In the solid electrolyte structure production method of this embodiment, a procedure is selected depending on the properties of a solution containing a solid electrolyte material. As the solution containing the solid electrolyte material, a solution prepared by dispersing fine particles of a solid electrolyte in a solvent (a fine particle-containing solution) or a sol solution of a solid electrolyte precursor (a precursor sol solution) may be used. The fine particle-containing solution may be prepared by the steps of synthesizing the solid electrolyte, finely grinding the solid electrolyte to obtain the fine particles, and dispersing the fine particles in the solvent. The fine particles are not dissolved in the solvent, and the fine particle-containing solution is in the suspension state. The precursor sol solution is a nearly clear solution with no solid precipitations, composed of a mixture of liquid materials containing elements for the desired solid electrolyte. Particularly in the case of using the precursor sol solution, it is preferable to use a nonwoven fabric.

Three production methods using the fine particle-containing solution (first to third production methods) will be described below, and then three production methods using the precursor sol solution (fourth to sixth production methods) will be described. It should be noted that the fourth to sixth production methods can be carried out using the fine particle-containing solution.

The first production method will be described with reference to FIGS. 1 to 3B.

Figure 1:
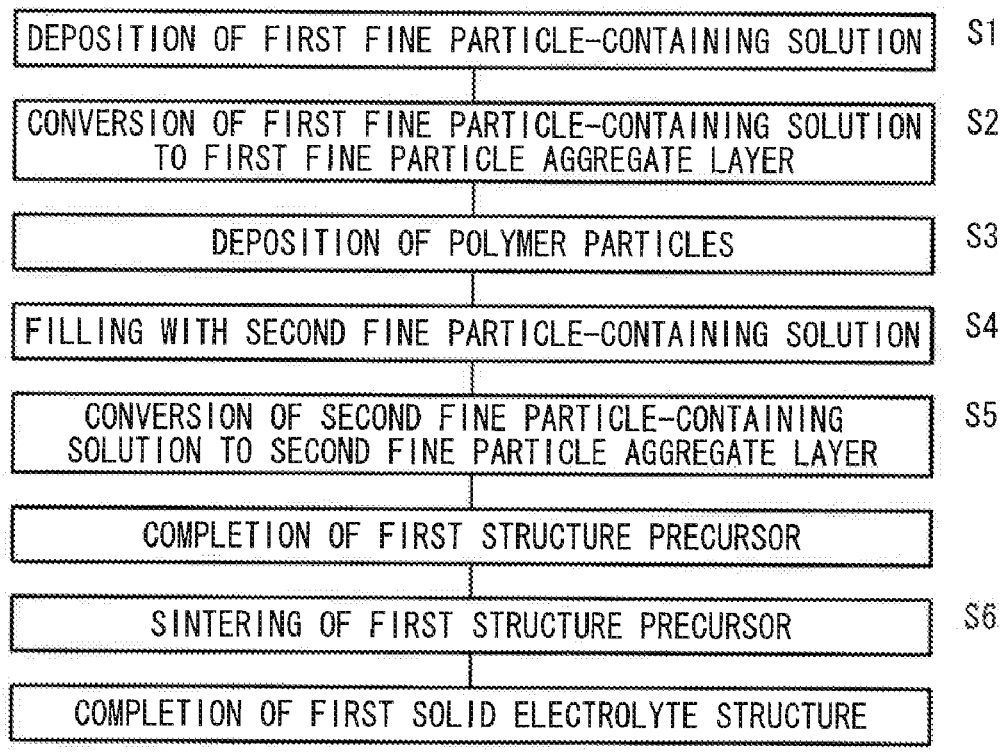
FIG. 1 is a process block diagram of a first production method.
Figure 2A:
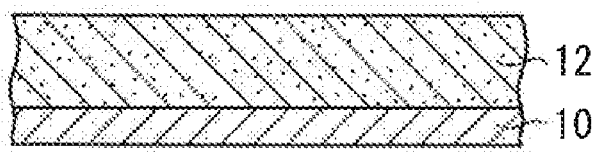
FIG. 2A is a view showing the step of depositing a first fine particle-containing solution on a substrate.

First, in the step S1 of FIG. 1, as shown in FIG. 2A, a solution prepared by dispersing fine particles of a solid electrolyte in a solvent (a first fine particle-containing solution 12) is deposited on a desired substrate 10.

Figure 2B:
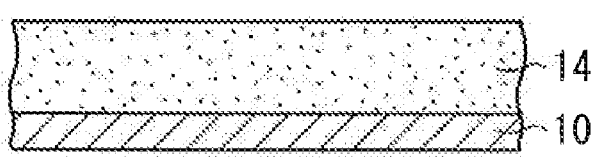
FIG. 2B is a view showing the step of drying the first fine particle-containing solution on the substrate to form a first fine particle aggregate layer.

In the step S2 of FIG. 1, as shown in FIG. 2B, the first fine particle-containing solution 12 is dried to form a layer of aggregated fine particles (a first fine particle aggregate layer 14).

Figure 2C:
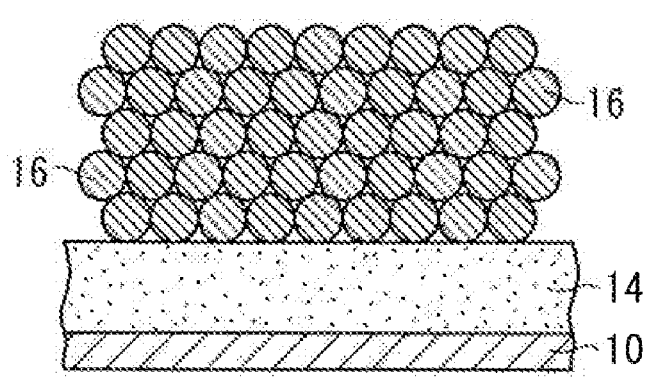
FIG. 2C is a view showing the step of depositing polymer particles on the first fine particle aggregate layer.

In the step S3 of FIG. 1, as shown in FIG. 2C, a large number of particles or monodisperse particles of a polymer such as a polystyrene or a polymethyl methacrylate PMMA (hereinafter referred to as polymer particles 16) are deposited on the first fine particle aggregate layer 14.

Figure 2D:
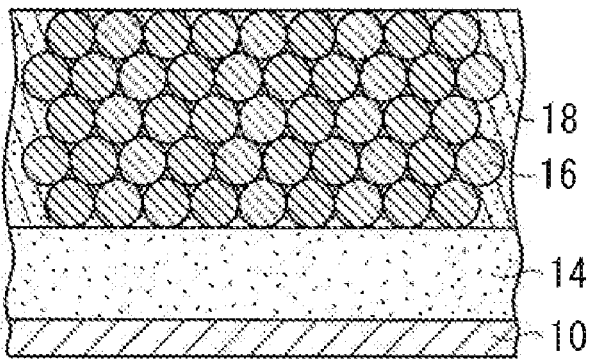
FIG. 2D is a view showing the step of filling the gap between the polymer particles with a second fine particle-containing solution such that the polymer particles are immersed in the solution.

In the step S4 of FIG. 1, as shown in FIG. 2D, the gap between the polymer particles 16 deposited on the first fine particle aggregate layer 14 is filled with a solution prepared by dispersing fine particles of a solid electrolyte in a solvent (a second fine particle-containing solution 18) such that the polymer particles 16 are immersed in the solution.

Figure 3A:
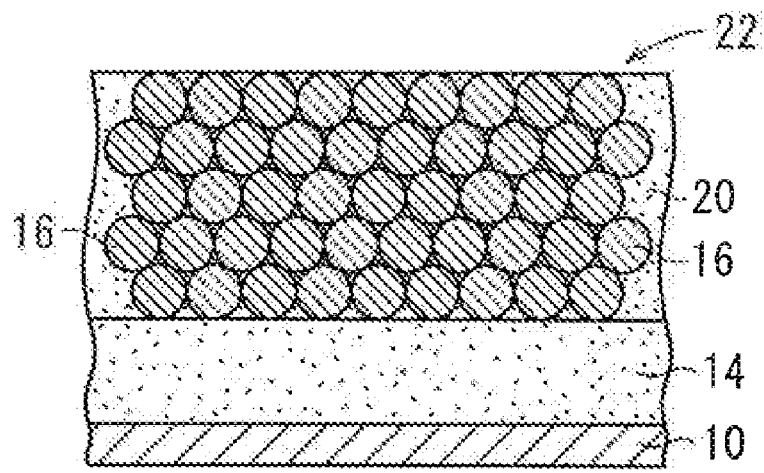
FIG. 3A is a view showing the step of drying the second fine particle-containing solution, thereby forming a second fine particle aggregate layer to prepare a first structure precursor.

In the step S5 of FIG. 1, as shown in FIG. 3A, the second fine particle-containing solution 18 is dried to form a layer of aggregated fine particles (a second fine particle aggregate layer 20). At this stage, a large number of the polymer particles 16 are embedded in the second fine particle aggregate layer 20, and a first precursor of a solid electrolyte structure (hereinafter referred to as a first structure precursor 22) is completed.

Figure 3B:
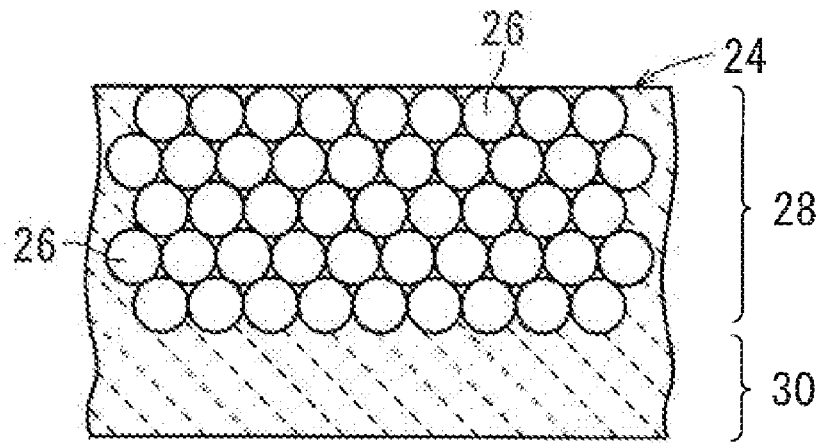
FIG. 3B is a view showing the step of calcining and sintering the first structure precursor to produce a first solid electrolyte structure.

In the step S6 of FIG. 1, as shown in FIG. 3B, the first structure precursor 22 is separated from the substrate 10 and thermally treated (subjected to a calcination treatment, followed by a sintering treatment), to complete production of a first solid electrolyte structure 24. In this step, the polymer particles 16 in the second fine particle aggregate layer 20 are decomposed and removed by the thermal treatment to form pores 26, so that the second fine particle aggregate layer 20 is converted to a porous solid electrolyte portion 28. The first fine particle aggregate layer 14 is converted to a nonporous dense body (a dense solid electrolyte portion 30). Thus, by the thermal treatment, the first solid electrolyte structure 24, which contains the porous solid electrolyte portion 28 and the dense solid electrolyte portion 30 in the integrated state, is completed.

Though the polymer particles 16 are deposited beforehand and then immersed in the second fine particle-containing solution 18 in this example, a mixture of the second fine particle-containing solution 18 and the polymer particles 16 may be deposited on the first fine particle aggregate layer 14 in the step S4 of FIG. 1, the step S3 being omitted.

The second production method will be described with reference to FIGS. 4 to 6B.

Figure 4:
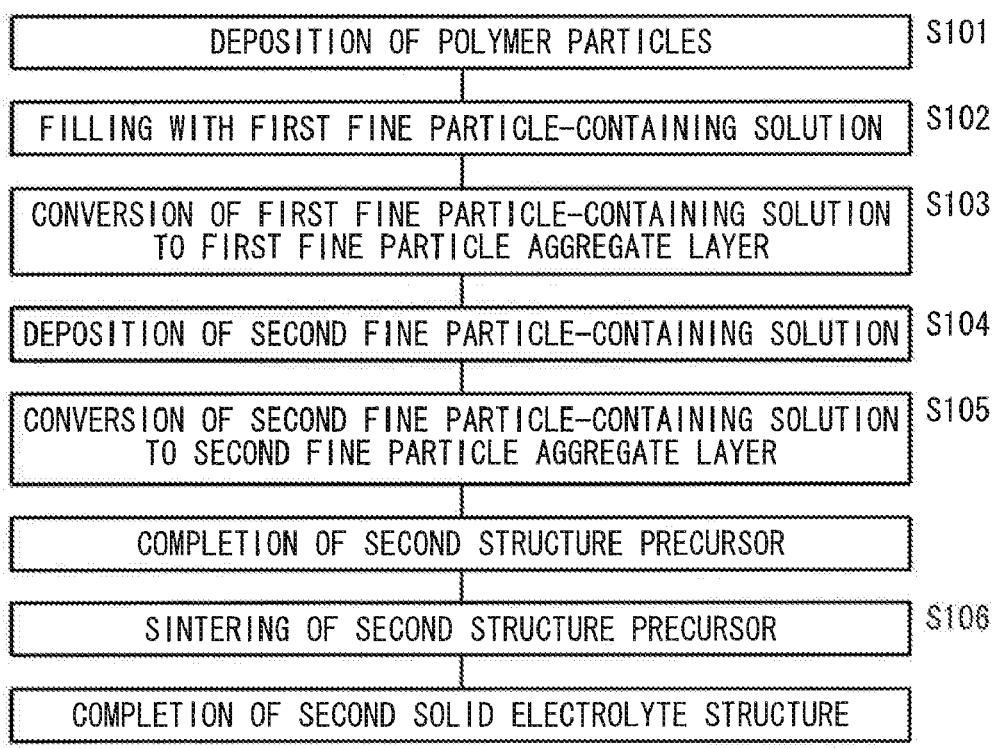
FIG. 4 is a process block diagram of a second production method.
Figure 5A:
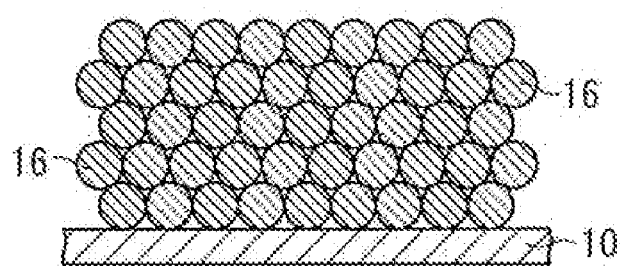
FIG. 5A is a view showing the step of depositing polymer particles on a substrate.

First, in the step S101 of FIG. 4, as shown in FIG. 5A, polymer particles 16 are deposited on a desired substrate 10.

Figure 5B:
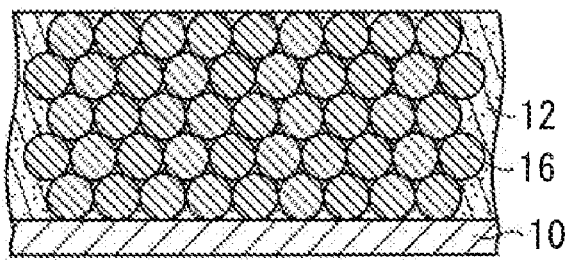
FIG. 5B is a view showing the step of filling the gap between the polymer particles with a first fine particle-containing solution such that the polymer particles are immersed in the solution.

In the step S102 of FIG. 4, as shown in FIG. 5B, the gap between the polymer particles 16 deposited on the substrate 10 is filled with a solution prepared by dispersing fine particles of a solid electrolyte in a solvent (a first fine particle-containing solution 12) such that the polymer particles 16 are immersed in the solution.

Figure 5C:
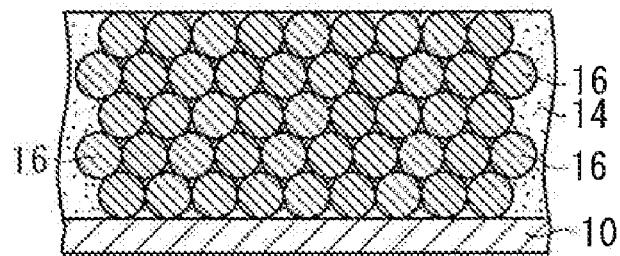
FIG. 5C is a view showing the step of drying the first fine particle-containing solution on the substrate to form a first fine particle aggregate layer.

In the step S103 of FIG. 4, as shown in FIG. 5C, the first fine particle-containing solution 12 is dried to form a layer of aggregated fine particles (a first fine particle aggregate layer 14). Thus, a large number of the polymer particles 16 are embedded in the first fine particle aggregate layer 14.

Figure 5D:
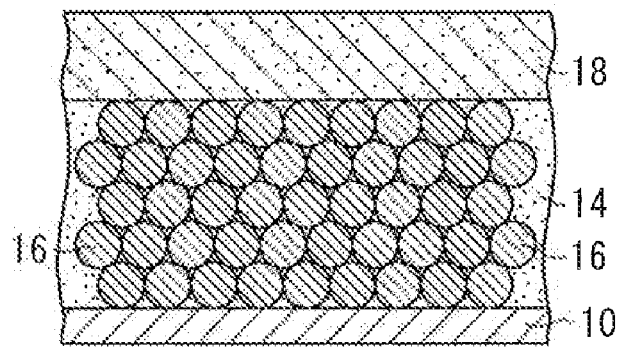
FIG. 5D is a view showing the step of depositing a second fine particle-containing solution on the first fine particle aggregate layer.

In the step S104 of FIG. 4, as shown in FIG. 5D, a solution prepared by dispersing fine particles of a solid electrolyte in a solvent (a second fine particle-containing solution 18) is deposited on the first fine particle aggregate layer 14.

Figure 6A:
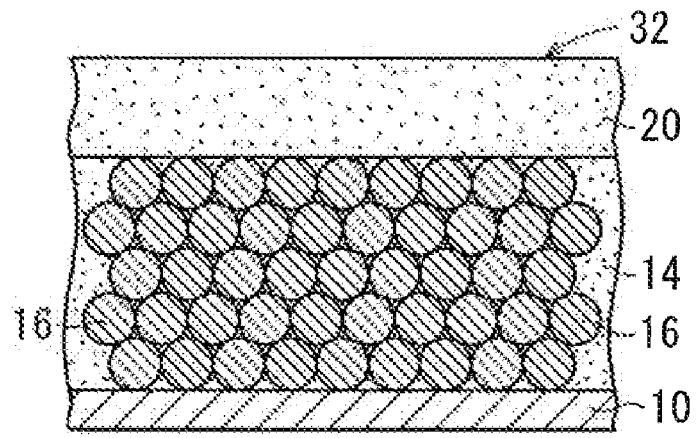
FIG. 6A is a view showing the step of drying the second fine particle-containing solution, thereby forming a second fine particle aggregate layer to prepare a second structure precursor.

In the step S105 of FIG. 4, as shown in FIG. 6A, the second fine particle-containing solution 18 is dried to form a layer of aggregated fine particles (a second fine particle aggregate layer 20). At this stage, a second precursor of a solid electrolyte structure (hereinafter referred to as a second structure precursor 32) is completed.

Figure 6B:
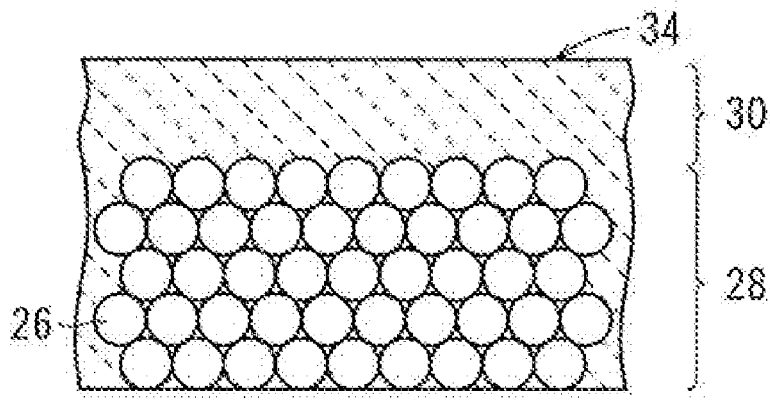
FIG. 6B is a view showing the step of calcining and sintering the second structure precursor to produce a second solid electrolyte structure.

In the step S106 of FIG. 4, as shown in FIG. 6B, the second structure precursor 32 is separated from the substrate 10 and thermally treated (subjected to a calcination treatment, followed by a sintering treatment), to complete production of a second solid electrolyte structure 34. In this step, the polymer particles 16 in the first fine particle aggregate layer 14 are decomposed and removed by the thermal treatment to form pores 26, so that the first fine particle aggregate layer 14 is converted to a porous solid electrolyte portion 28. The second fine particle aggregate layer 20 is converted to a dense solid electrolyte portion 30. Thus, by the thermal treatment, the second solid electrolyte structure 34, which contains the porous solid electrolyte portion 28 and the dense solid electrolyte portion 30 in the integrated state, is completed.

Though the polymer particles 16 are deposited beforehand and then the gap therebetween is filled with the first fine particle-containing solution 12 in this example, a mixture of the first fine particle-containing solution 12 and the polymer particles 16 may be deposited on the substrate 10 in the step S102 of FIG. 4, the step S101 being omitted.

In the first and second production methods, the integral structure of the porous solid electrolyte portion 28 and the dense solid electrolyte portion 30 (the first solid electrolyte structure 24 and the second solid electrolyte structure 34) can be produced in the above manner. Thus, an excellent connection interface is formed between the porous solid electrolyte portion 28 and the dense solid electrolyte portion 30, an additional process of connecting a solid electrolyte to the porous solid electrolyte portion of the composite electrode is not required, and it is not necessary to pressurize or sinter the porous solid electrolyte portion 28 and the dense solid electrolyte portion 30.

The third production method will be described with reference to FIGS. 7 to 10B.

Figure 7:
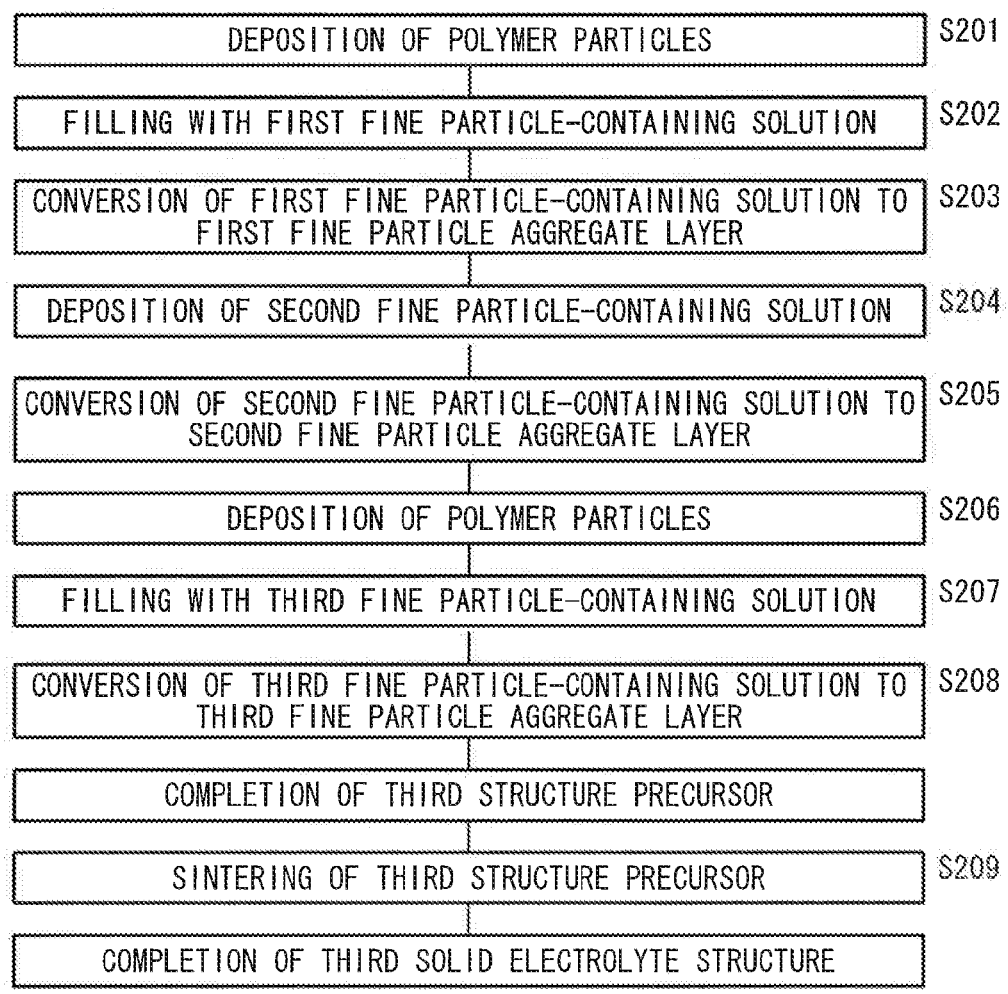
FIG. 7 is a process block diagram of a third production method.
Figure 8A:
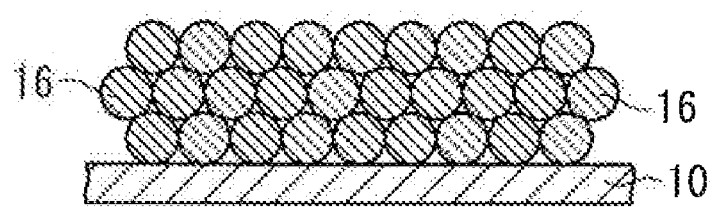
FIG. 8A is a view showing the step of depositing polymer particles on a substrate.

First, in the step S201 of FIG. 7, as shown in FIG. 8A, polymer particles 16 are deposited on a desired substrate 10.

Figure 8B:
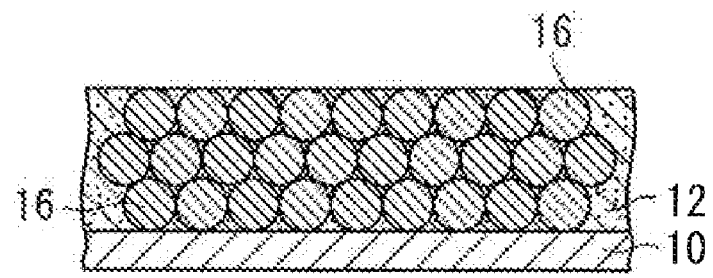
FIG. 8B is a view showing the step of filling the gap between the polymer particles on the substrate with a first fine particle-containing solution such that the polymer particles are immersed in the solution.

In the step S202 of FIG. 7, as shown in FIG. 8B, the gap between the polymer particles 16 is filled with a solution prepared by dispersing fine particles of a solid electrolyte in a solvent (a first fine particle-containing solution 12) such that the polymer particles 16 are immersed in the solution.

Figure 8C:
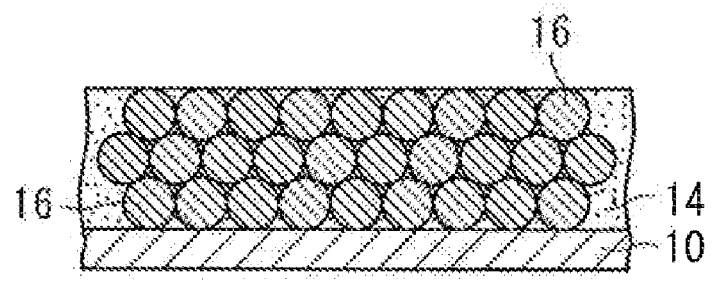
FIG. 8C is a view showing the step of drying the first fine particle-containing solution to form a first fine particle aggregate layer.

In the step S203 of FIG. 7, as shown in FIG. 8C, the first fine particle-containing solution 12 is dried to form a layer of aggregated fine particles (a first fine particle aggregate layer 14). Thus, a large number of the polymer particles 16 are embedded in the first fine particle aggregate layer 14.

Figure 8D:
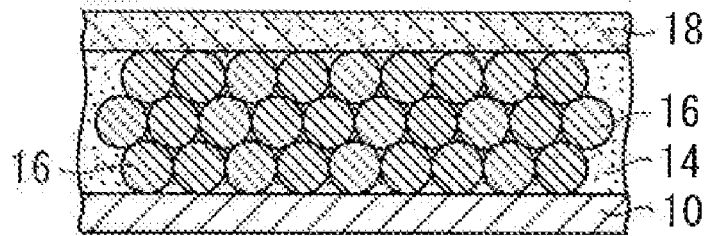
FIG. 8D is a view showing the step of depositing a second fine particle-containing solution on the first fine particle aggregate layer.

In the step S204 of FIG. 7, as shown in FIG. 8D, a solution prepared by dispersing fine particles of a solid electrolyte in a solvent (a second fine particle-containing solution 18) is deposited on the first fine particle aggregate layer 14.

Figure 9A:
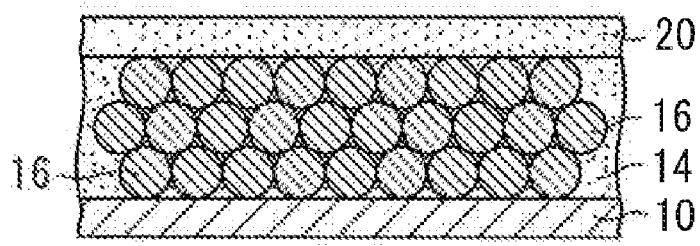
FIG. 9A is a view showing the step of drying the second fine particle-containing solution to form a second fine particle aggregate layer.

In the step S205 of FIG. 7, as shown in FIG. 9A, the second fine particle-containing solution 18 is dried to form a layer of aggregated fine particles (a second fine particle aggregate layer 20).

Figure 9B:
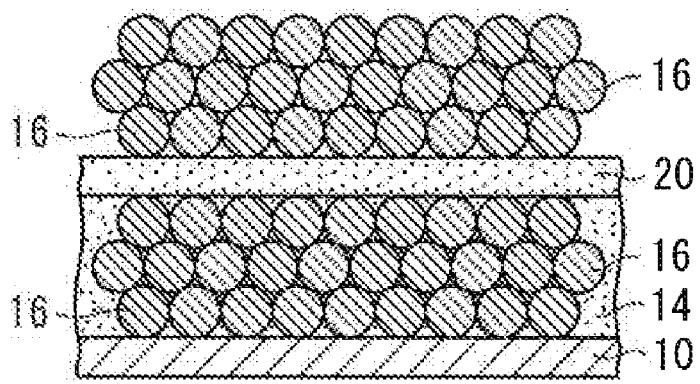
FIG. 9B is a view showing the step of depositing polymer particles on the second fine particle aggregate layer.

In the step S206 of FIG. 7, as shown in FIG. 9B, polymer particles 16 are deposited on the second fine particle aggregate layer 20.

Figure 9C:
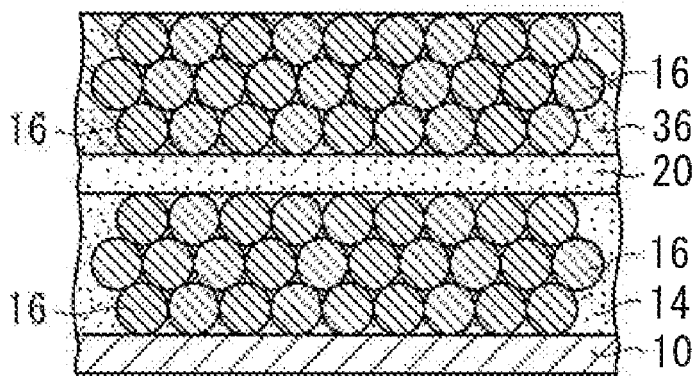
FIG. 9C is a view showing the step of filling the gap between the polymer particles on the second fine particle aggregate layer with a third fine particle-containing solution such that the polymer particles are immersed in the solution.

In the step S207 of FIG. 7, as shown in FIG. 9C, the gap between of the polymer particles 16 deposited on the second fine particle aggregate layer 20 is filled with a solution prepared by dispersing fine particles of a solid electrolyte in a solvent (a third fine particle-containing solution 36) such that the polymer particles 16 are immersed in the solution.

Figure 10A:
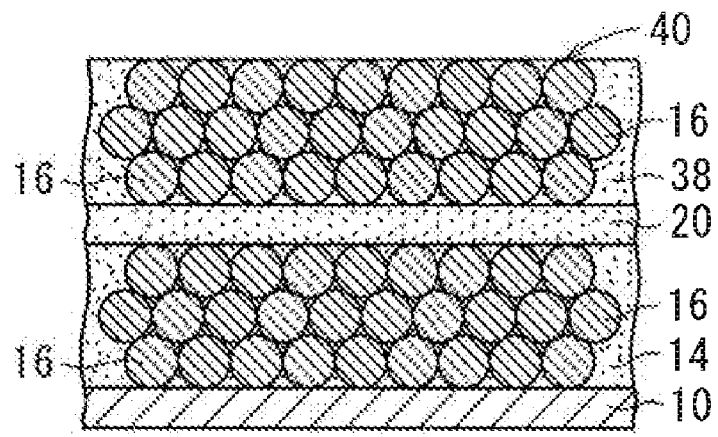
FIG. 10A is a view showing the step of drying the third fine particle-containing solution, thereby forming a third fine particle aggregate layer to prepare a third structure precursor.

In the step S208 of FIG. 7, as shown in FIG. 10A, the third fine particle-containing solution 36 is dried to form a layer of aggregated fine particles (a third fine particle aggregate layer 38). Thus, a large number of the polymer particles 16 are embedded in the third fine particle aggregate layer 38. At this stage, a third precursor of a solid electrolyte structure (hereinafter referred to as a third structure precursor 40) is completed.

Figure 10B:
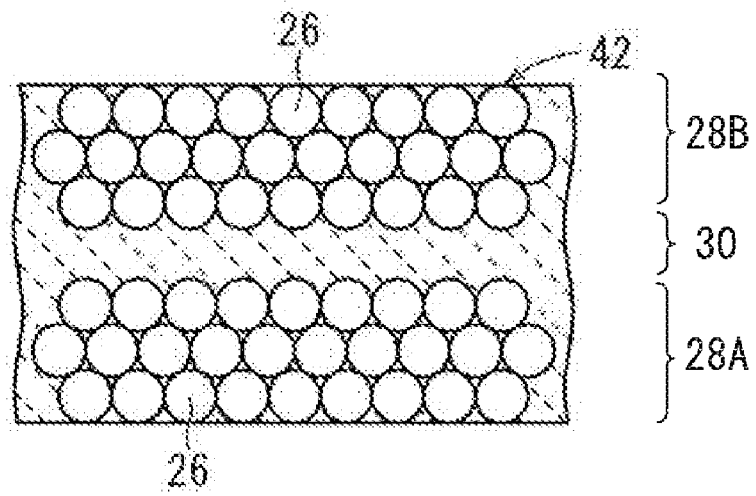
FIG. 10B is a view showing the step of calcining and sintering the third structure precursor to produce a third solid electrolyte structure.

In the step S209 of FIG. 7, as shown in FIG. 10B, the third structure precursor 40 is thermally treated (subjected to a calcination treatment, followed by a sintering treatment), to complete production of a third solid electrolyte structure 42. In this step, the polymer particles 16 in the first fine particle aggregate layer 14 and the third fine particle aggregate layer 38 are decomposed and removed by the thermal treatment to form pores 26, so that the first fine particle aggregate layer 14 and the third fine particle aggregate layer 38 are converted to porous solid electrolyte portions (a first porous solid electrolyte portion 28A and a second porous solid electrolyte portion 28B) respectively. The second fine particle aggregate layer 20 is converted to a dense solid electrolyte portion 30. Thus, by the thermal treatment, the third solid electrolyte structure 42, which contains the dense solid electrolyte portion 30, the first porous solid electrolyte portion 28A formed on one side thereof, and the second porous solid electrolyte portion 28B formed on the other side thereof in the integrated state, is completed.

Though the polymer particles 16 are deposited beforehand and the gap therebetween is then filled with the first fine particle-containing solution 12 in this example, a mixture of the first fine particle-containing solution 12 and the polymer particles 16 may be deposited on the substrate 10 in the step S202 of FIG. 7, the step S201 being omitted. Similarly, though the polymer particles 16 are deposited beforehand and the gap therebetween is then filled with the third fine particle-containing solution 36 in this example, a mixture of the third fine particle-containing solution 36 and the polymer particles 16 may be deposited on the second fine particle aggregate layer 20 in the step S207 of FIG. 7, the step S206 being omitted.

In the third production method, the integral structure of the first porous solid electrolyte portion 28A, the dense solid electrolyte portion 30, and the second porous solid electrolyte portion 28B (the third solid electrolyte structure 42) can be produced in the above manner. Thus, excellent connection interfaces are formed between the first porous solid electrolyte portion 28A and the dense solid electrolyte portion 30 and between the second porous solid electrolyte portion 28B and the dense solid electrolyte portion 30, and an additional process of connecting a solid electrolyte to the porous solid electrolyte portion of the composite electrode by pressurization, sintering, etc. is not required.

In the first to third production methods, the solid electrolyte materials contained in the fine particle-containing solutions for forming the porous solid electrolyte portions and the solid electrolyte materials contained in the sols for forming the dense solid electrolyte portions may be of the same or different types.

The average particle diameter of the fine solid electrolyte particles in the fine particle-containing solutions is 10 nm to 2 μm (=2,000 nm), preferably 100 nm to 1 μm (=1,000 nm).

The fourth production method will be described with reference to FIGS. 11 to 13B.

Figure 11:
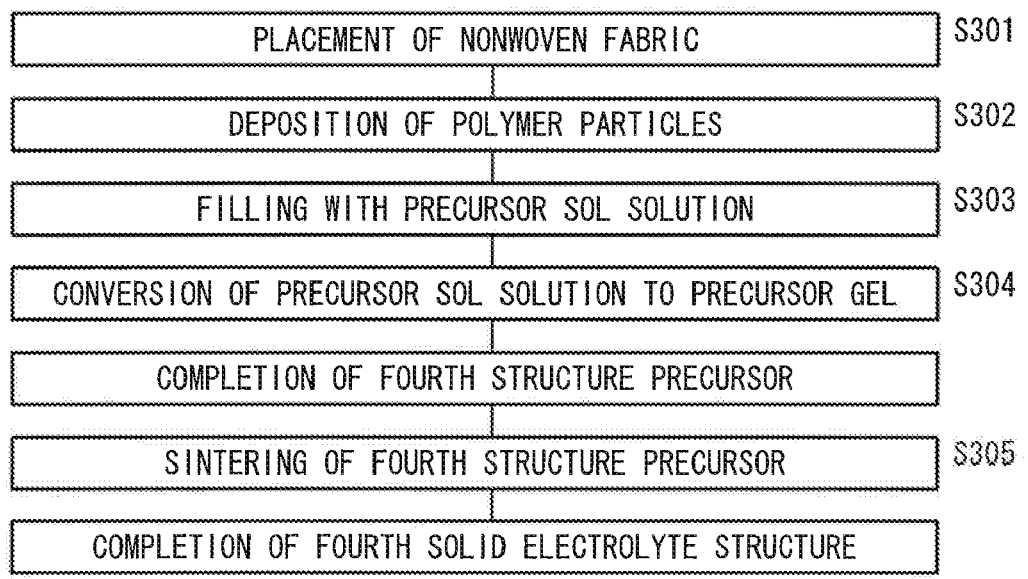
FIG. 11 is a process block diagram of a fourth production method.
Figure 12A:
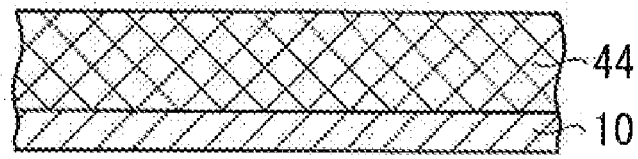
FIG. 12A is a view showing the step of placing a nonwoven fabric on a substrate.

First, in the step S301 of FIG. 11, as shown in FIG. 12A, a nonwoven fabric 44 is placed on a desired substrate 10.

Figure 12B:
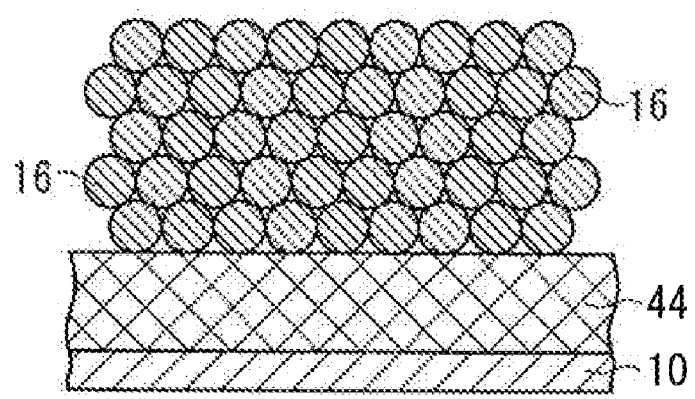
FIG. 12B is a view showing the step of depositing polymer particles on the nonwoven fabric.

In the step S302 of FIG. 11, as shown in FIG. 12B, polymer particles 16 are deposited on the nonwoven fabric 44.

Figure 12C:
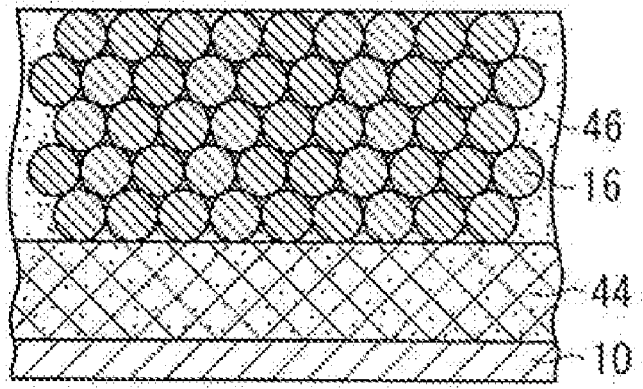
FIG. 12C is a view showing the step of filling the gap between the polymer particles with a precursor sol solution such that the polymer particles are immersed in the sol solution.

In the step S303 of FIG. 11, as shown in FIG. 12C, the gap between of the polymer particles 16 deposited on the nonwoven fabric 44 is filled with a sol solution of a solid electrolyte precursor (a precursor sol solution 46) such that the polymer particles 16 are immersed in the sol solution. In this step, not only the gap between the polymer particles 16 but also spaces in the nonwoven fabric 44 are filled with the precursor sol solution 46.

Figure 13A:
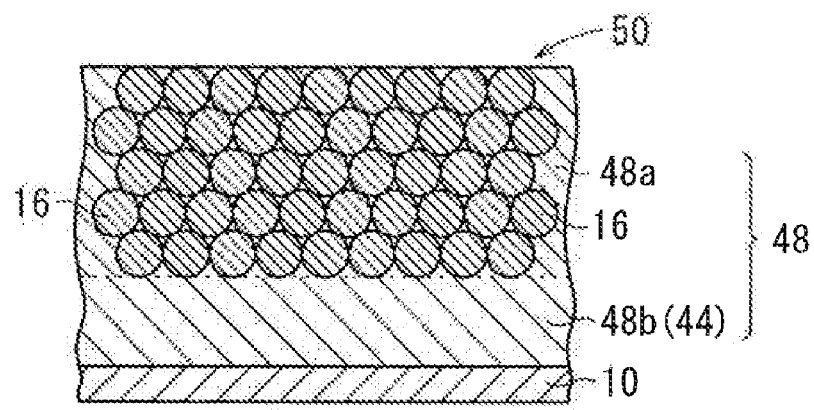
FIG. 13A is a view showing the step of converting the precursor sol solution to a precursor gel, to prepare a fourth structure precursor.

In the step S304 of FIG. 11, as shown in FIG. 13A, the precursor sol solution 46 is converted to a gel. In this step, a dispersion with no fluidity (a solid electrolyte precursor gel 48) is generated from the precursor sol solution 46. Thus, a large number of the polymer particles 16 and the nonwoven fabric 44 are embedded in the precursor gel 48. At this stage, a fourth precursor of a solid electrolyte structure (hereinafter referred to as a fourth structure precursor 50) is completed. In the precursor gel 48, a portion, in which the polymer particles 16 are embedded, is referred to as a first precursor gel 48a, and a portion, in which the nonwoven fabric 44 is embedded, is referred to as a second precursor gel 48b.

Figure 13B:
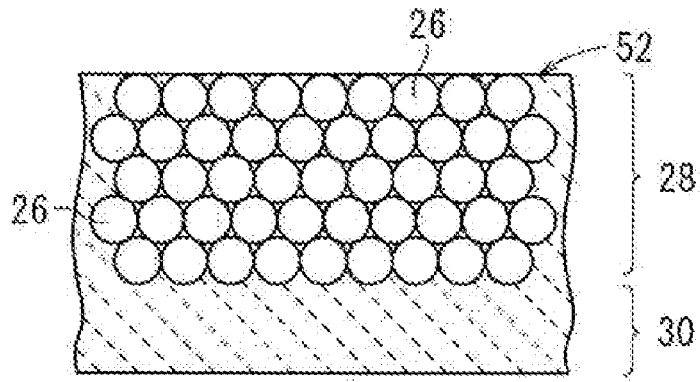
FIG. 13B is a view showing the step of calcining and sintering the fourth structure precursor to produce a fourth solid electrolyte structure.

In the step S305 of FIG. 11, as shown in FIG. 13B, the fourth structure precursor 50 is separated from the substrate 10, and thermally treated (subjected to a calcination treatment, followed by a sintering treatment), to complete production of a fourth solid electrolyte structure 52. In this step, the polymer particles 16 in the first precursor gel 48a are decomposed and removed by the thermal treatment to form pores 26, so that the first precursor gel 48a is converted to a porous solid electrolyte portion 28. The second precursor gel 48b, in which the nonwoven fabric 44 is embedded, is converted to a dense solid electrolyte portion 30. Thus, by the thermal treatment, the fourth solid electrolyte structure 52, which contains the porous solid electrolyte portion 28 and the dense solid electrolyte portion 30 in the integrated state, is completed.

Though the polymer particles 16 are deposited beforehand and the gap therebetween is then filled with the precursor sol solution 46 in this example, a mixture sol solution of the precursor sol solution 46 and the polymer particles 16 may be deposited on the nonwoven fabric 44 in the step S303 of FIG. 11, the step S302 being omitted.

The fifth production method will be described with reference to FIGS. 14 to 15D.

Figure 14:
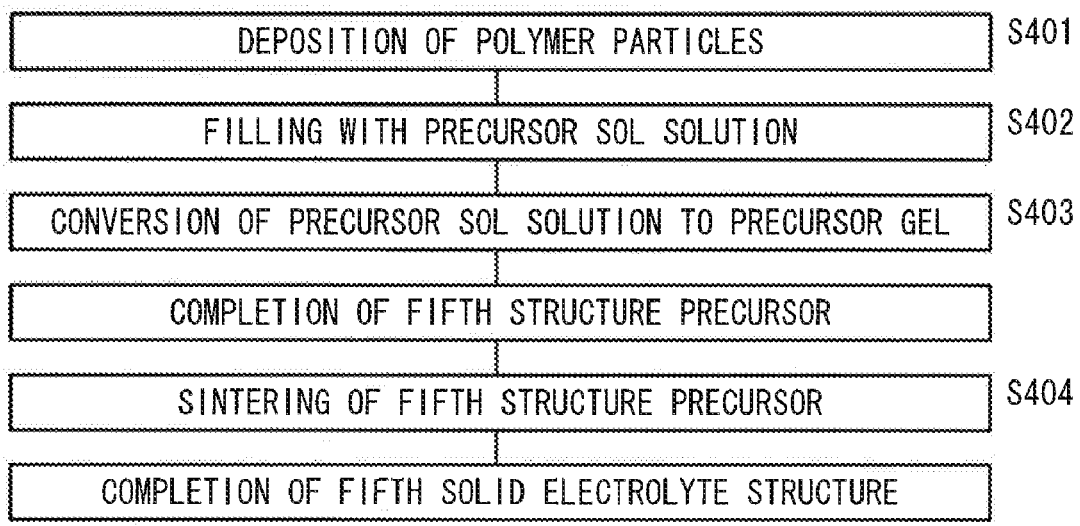
FIG. 14 is a process block diagram of a fifth production method.
Figure 15A:
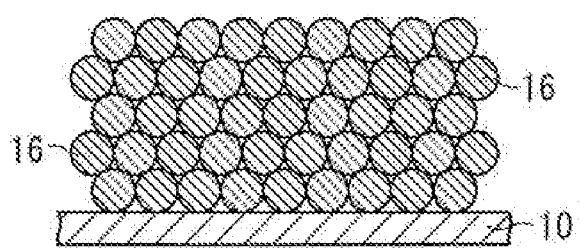
FIG. 15A is a view showing the step of depositing polymer particles on a substrate.

First, in the step S401 of FIG. 14, as shown in FIG. 15A, polymer particles 16 are deposited on a desired substrate 10.

Figure 15B:
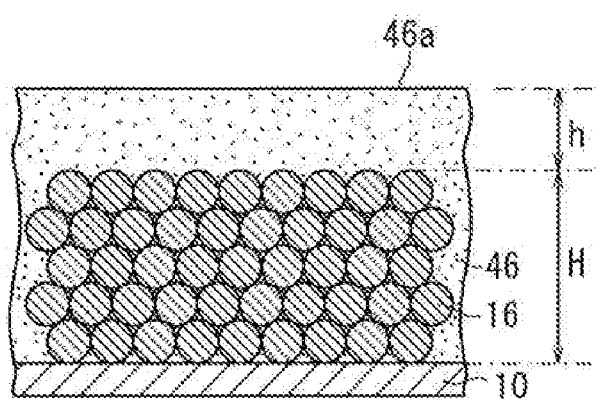
FIG. 15B is a view showing the step of filling the gap between the polymer particles with a precursor sol solution such that the polymer particles are immersed in the sol solution.

In the step S402 of FIG. 14, as shown in FIG. 15B, the gap between the polymer particles 16 deposited on the substrate 10 is filled with a precursor sol solution 46 such that the polymer particles 16 are immersed in the precursor sol solution 46. In this step, spaces between the polymer particles 16 are filled with the precursor sol solution 46. In this step, the precursor sol solution 46 is deposited such that the surface of the precursor sol solution 46 is positioned above the top of the aggregate polymer particles 16 having a height H. Thus, the solution surface 46a of the precursor sol solution 46 is positioned higher by a height h than the aggregate polymer particles 16 having the height H.

Figure 15C:
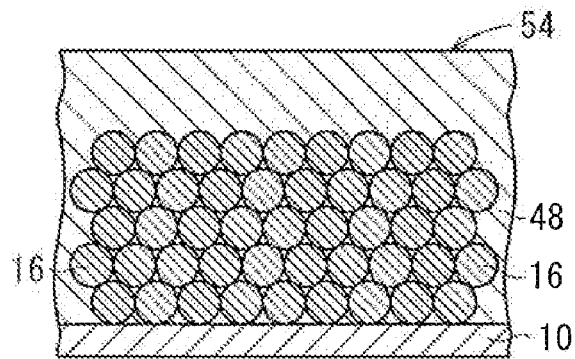
FIG. 15C is a view showing the step of converting the precursor sol solution on the substrate to a precursor gel, to prepare a fifth structure precursor.

In the step S403 of FIG. 14, as shown in FIG. 15C, the precursor sol solution 46 is converted to a gel. In this step, a dispersion with no fluidity (a precursor gel 48) is generated from the precursor sol solution 46. Thus, a large number of the polymer particles 16 are embedded in the precursor gel 48. At this stage, a fifth precursor of a solid electrolyte structure (hereinafter referred to as a fifth structure precursor 54) is completed.

Figure 15D:
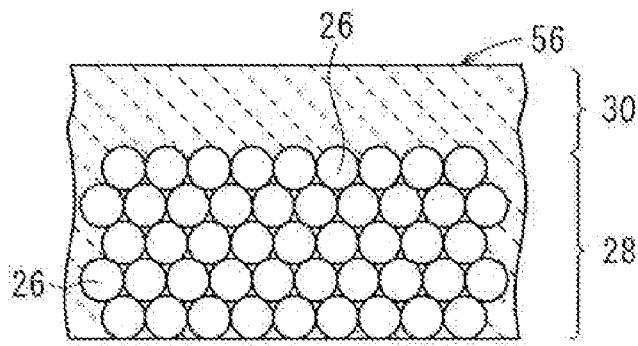
FIG. 15D is a view showing the step of calcining and sintering the fifth structure precursor to produce a fifth solid electrolyte structure.

In the step S404 of FIG. 14, as shown in FIG. 15D, the fifth structure precursor 54 is separated from the substrate 10, and thermally treated (subjected to a calcination treatment, followed by a sintering treatment), to complete production of a fifth solid electrolyte structure 56. In this step, the polymer particles 16 in the precursor gel 48 are decomposed and removed by the thermal treatment to form pores 26. As a result, in the precursor gel 48, a portion having the polymer particles 16 is converted to a porous solid electrolyte portion 28, and a portion not having the polymer particles 16 (a portion with the height h, shown in FIG. 15B) is converted to a dense solid electrolyte portion 30. Thus, by the thermal treatment, the fifth solid electrolyte structure 56, which contains the porous solid electrolyte portion 28 and the dense solid electrolyte portion 30 in the integrated state, is completed.

In the fourth and fifth production methods, the integral structure of the porous solid electrolyte portion 28 and the dense solid electrolyte portion 30 (the fourth solid electrolyte structure 52 and the fifth solid electrolyte structure 56) can be produced in the above manner. Thus, an excellent connection interface is formed between the porous solid electrolyte portion 28 and the dense solid electrolyte portion 30, an additional process of connecting a solid electrolyte to the porous solid electrolyte portion of the composite electrode is not required, and it is not necessary to pressurize or sinter the porous solid electrolyte portion 28 and the dense solid electrolyte portion 30.

The sixth production method will be described with reference to FIGS. 16 to 18B.

Figure 16:
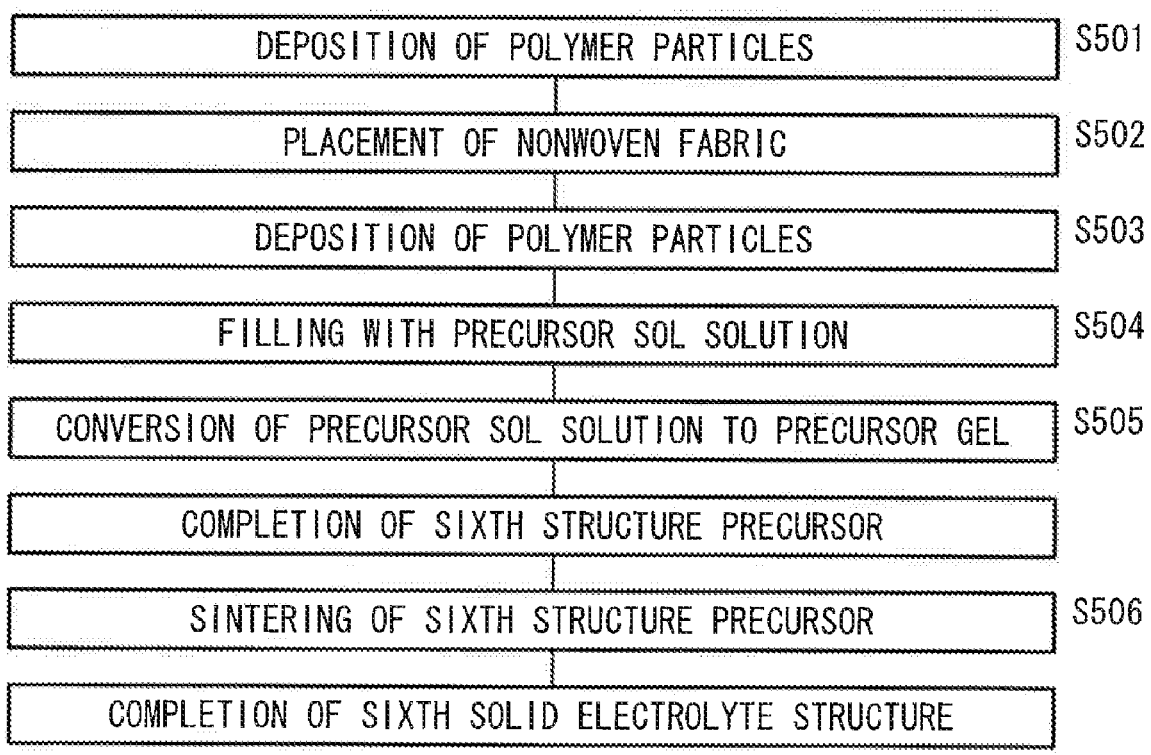
FIG. 16 is a process block diagram of a sixth production method.
Figure 17A:
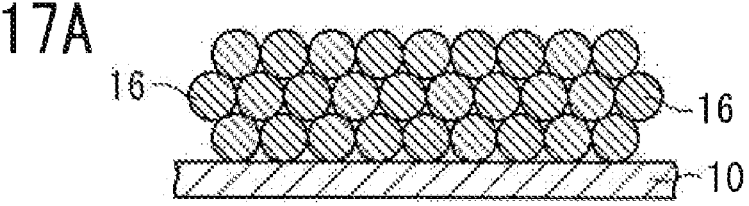
FIG. 17A is a view showing the step of depositing polymer particles on a substrate.

First, in the step S501 of FIG. 16, as shown in FIG. 17A, polymer particles 16 are deposited on a desired substrate 10.

Figure 17B:
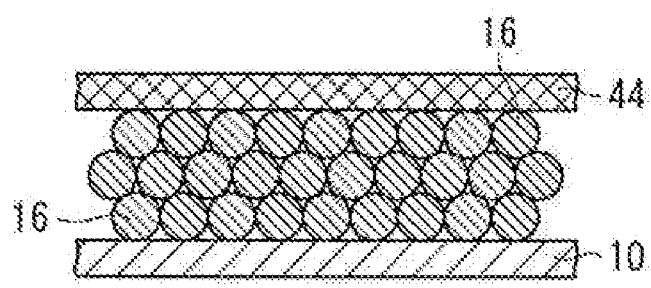
FIG. 17B is a view showing the step of placing a nonwoven fabric on the polymer particles.

In the step S502 of FIG. 16, as shown in FIG. 17B, a nonwoven fabric 44 is placed on the polymer particles 16.

Figure 17C:
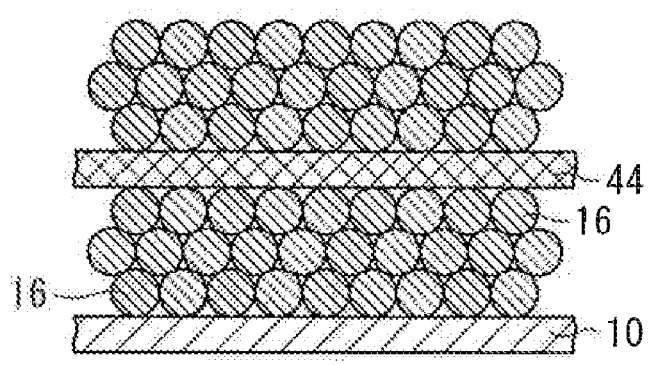
FIG. 17C is a view showing the step of depositing polymer particles on the nonwoven fabric.

In the step S503 of FIG. 16, as shown in FIG. 17C, polymer particles 16 are deposited on the nonwoven fabric 44.

Figure 17D:
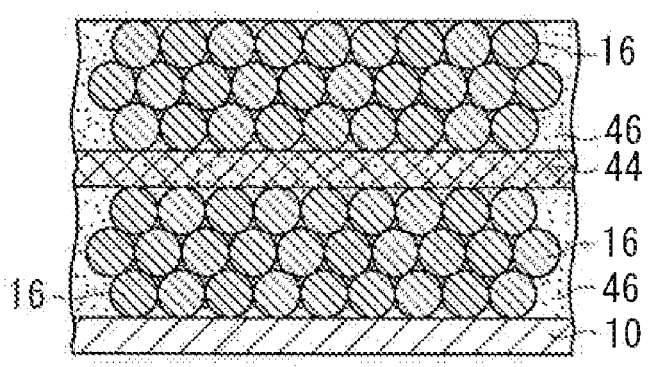
FIG. 17D is a view showing the step of filling the gap between the polymer particles on the nonwoven fabric, the nonwoven fabric, and the gap between the polymer particles on the substrate with a precursor sol solution such that the polymer particles and the nonwoven fabric are immersed in the sol solution.

In the step S504 of FIG. 16, as shown in FIG. 17D, the spaces in the nonwoven fabric 44, between the polymer particles 16 deposited on the nonwoven fabric 44, and between the polymer particles 16 deposited on the substrate 10 are filled with a precursor sol solution 46 such that the nonwoven fabric 44 and the polymer particles 16 are immersed in the precursor sol solution 46. In this step, not only spaces between the polymer particles 16 on the nonwoven fabric 44 and on the substrate 10 but also spaces in the nonwoven fabric 44 are filled with the precursor sol solution 46.

Figure 18A:
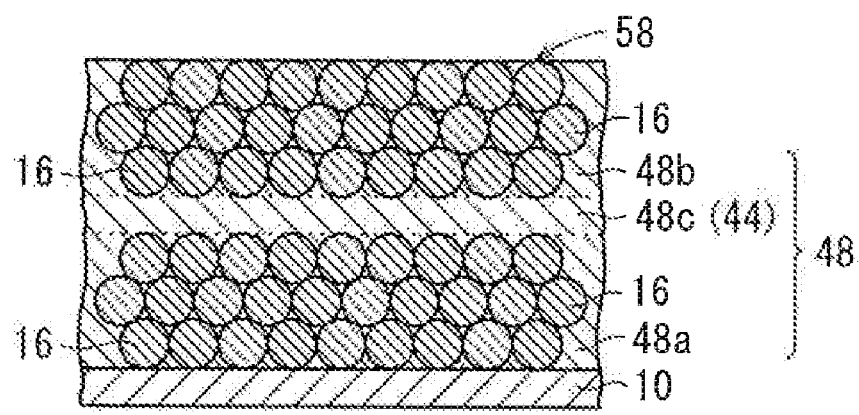
FIG. 18A is a view showing the step of converting the precursor sol solution to a precursor gel, to prepare a sixth structure precursor.

In the step S505 of FIG. 16, as shown in FIG. 18A, the precursor sol solution 46 is converted to a gel. In this step, a dispersion with no fluidity (a precursor gel 48) is generated from the precursor sol solution 46. Thus, a large number of the polymer particles 16 and the nonwoven fabric 44 are embedded in the precursor gel 48. At this stage, a sixth precursor of a solid electrolyte structure (hereinafter referred to as a sixth structure precursor 58) is completed. In the precursor gel 48, portions, in which the polymer particles 16 are embedded, are referred to as a first precursor gel 48a and a second precursor gel 48b, and a portion, in which the nonwoven fabric 44 is embedded, is referred to as a third precursor gel 48c.

Figure 18B:
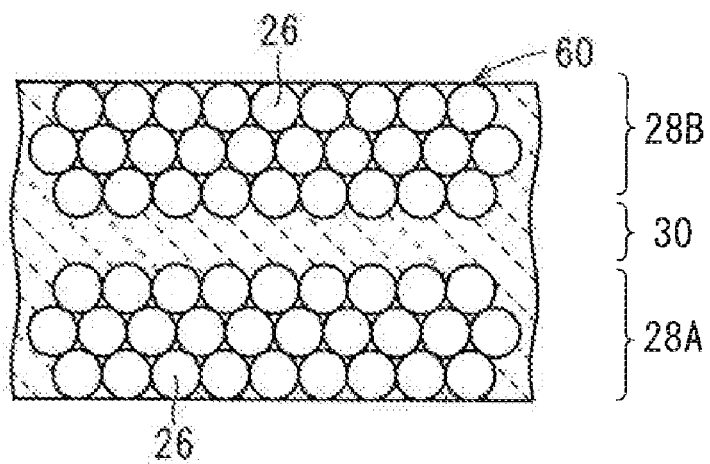
FIG. 18B is a view showing the step of calcining and sintering the sixth structure precursor to produce a sixth solid electrolyte structure.

In the step S506 of FIG. 16, as shown in FIG. 18B, the sixth structure precursor 58 is separated from the substrate 10, and thermally treated (subjected to a calcination treatment, followed by a sintering treatment), to complete production of a sixth solid electrolyte structure 60. In this step, the polymer particles 16 in the first precursor gel 48a and the second precursor gel 48b are decomposed and removed by the thermal treatment to form pores 26. As a result, the first precursor gel 48a is converted to a first porous solid electrolyte portion 28A, the second precursor gel 48b is converted to a second porous solid electrolyte portion 28B, and the third the precursor gel 48c, in which the nonwoven fabric 44 is embedded, is converted to a dense solid electrolyte portion 30. Thus, by the thermal treatment, the sixth solid electrolyte structure 60, which contains the dense solid electrolyte portion 30, the first porous solid electrolyte portion 28A formed on one side thereof, and the second porous solid electrolyte portion 28B formed on the other side thereof in the integrated state, is completed.

In the sixth production method, the integral structure of the first porous solid electrolyte portion 28A, the dense solid electrolyte portion 30, and the second porous solid electrolyte portion 28B (the sixth solid electrolyte structure 60) can be produced in the above manner. Thus, excellent connection interfaces are formed between the first porous solid electrolyte portion 28A and the dense solid electrolyte portion 30 and between the second porous solid electrolyte portion 28B and the dense solid electrolyte portion 30, and an additional process of connecting a solid electrolyte to the porous solid electrolyte portion of the composite electrode by pressurization, sintering, etc. is not required.

Though the sol solutions of solid electrolyte precursors (the precursor sol solutions) are used in the above described fourth to sixth production methods, a solution prepared by dispersing fine solid electrolyte particles in a solvent (a fine particle-containing solution) may be used instead of the precursor sol solutions.

In the first to sixth production methods, the solid electrolyte is not particularly limited, and preferably comprises an LAGP ($Li_{1+x}Al_xGe_{2-x}(PO_4)_3$, $0 \leq x \leq 1$), an LATP ($Li_{1+x}Al_xTi_{2-x}(PO_4)_3$, $0 \leq x \leq 1$), an LLT ($Li_{3x}La_{2/3-x}TiO_3$, $0 \leq x \leq 2/3$), or an aluminum (Al)-containing ceramic material having a garnet-type or garnet-like-type crystal structure containing lithium (Li), lanthanum (La), zirconium (Zr), and oxygen (O).

The cell active material to be hereinafter described is not particularly limited, and preferably comprises an LVP ($Li_mV_2(PO_4)_3$, $1 \leq m \leq 5$), a lithium-manganese composite oxide (such as $LiMn_2O_4$), or a lithium-cobalt composite oxide (such as $LiCoO_2$).

In the step of depositing the polymer particles 16, the polymer particles 16 may be heated and fused as described in Japanese Laid-Open Patent Publication No. 2006-260887, Paragraph [0038] as a matter of course.

The polymer particles 16 may be commercially available particles or producible particles. When the average particle diameter of the polymer particles 16 is too large, the contact area between the solid electrolyte and the cell active material is reduced contrary to the initial purpose. On the other hand, when the average particle diameter is too small, it is difficult to fill the pores with the cell active material to produce an all-solid-state cell. The average particle diameter is preferably 0.5 to 10 μm, more preferably 1 to 5 μm.

The thickness of the dense solid electrolyte portion 30 is preferably 1 to 100 μm, more preferably 5 to 30 μm. When the dense solid electrolyte portion 30 is too thick, the portion has a high resistance. On the other hand, when the dense solid electrolyte portion 30 is too thin, the portion often has a defect, and positive and negative electrodes are more likely to cause short circuit.

The thickness of the porous solid electrolyte portion 28 is preferably 10 to 1,000 μm, more preferably 20 to 200 μm. When the porous solid electrolyte portion 28 is too thick, an electrode portion has a high resistance. On the other hand, when the porous solid electrolyte portion 28 is too thin, the amount of the cell active material is inevitably reduced to lower cell capacity.

In the first to sixth production methods, each structure precursor may be pressurized before the sintering step. In this case, the pressure applied to the structure precursor is preferably 10 to 100 MPa, and the pressurization time is preferably 1 to 10 minutes. By the pressurization, the solid electrolyte structure can be toughened advantageously.

Next, two methods for producing an all-solid-state cell (seventh and eighth production methods) will be described below.

The seventh production method will be described with reference to FIGS. 19A and 19B. The first solid electrolyte structure 24, the second solid electrolyte structure 34, the fourth solid electrolyte structure 52, or the fifth solid electrolyte structure 56 is used in the seventh production method. The first solid electrolyte structure 24 is used in the following description.

Figure 19A:
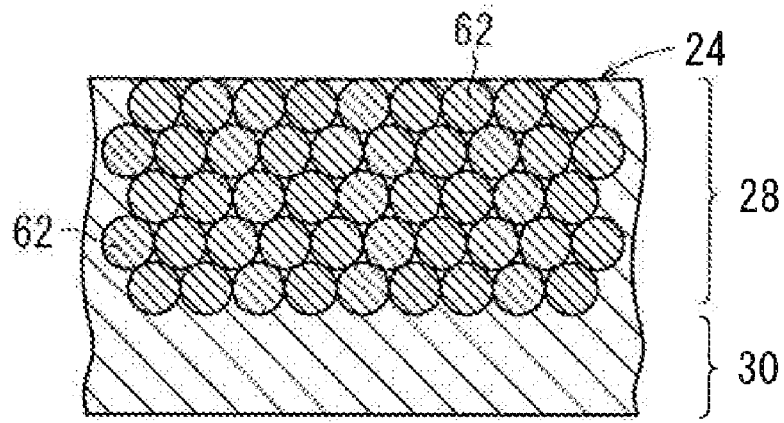
FIG. 19A is a view showing the step of filling pores in a porous solid electrolyte portion of the first solid electrolyte structure with a cell active material.

First, as shown in FIG. 19A, the porous solid electrolyte portion 28 of the first solid electrolyte structure 24 is filled with a cell active material 62. For example, the pores 26 in the porous solid electrolyte portion 28 of the first solid electrolyte structure 24 may be filled with the cell active material 62 by introducing a sol solution containing a cell active material precursor to the pores 26 and by thermally treating the introduced sol solution. For another example, a solution containing fine particles of the cell active material 62, smaller than the pores 26, may be introduced to the pores 26 in the porous solid electrolyte portion 28.

Figure 19B:
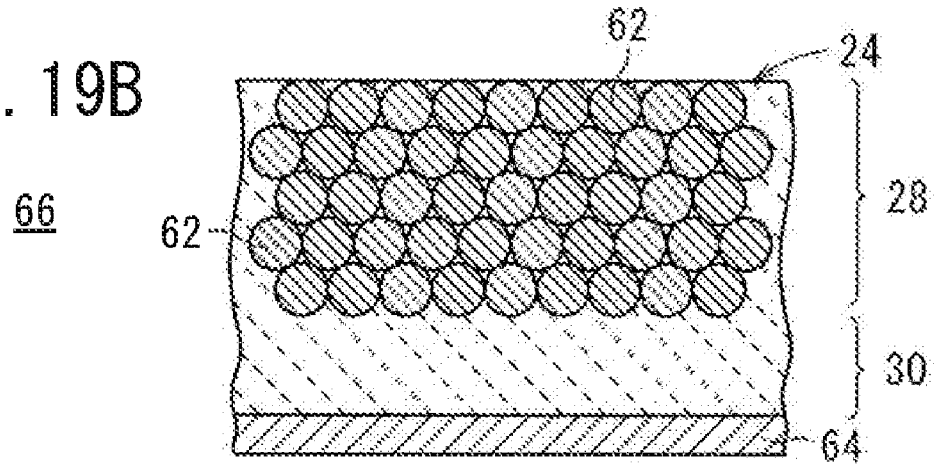
FIG. 19B is a view showing the step of forming a counter electrode on the surface of the first solid electrolyte structure, opposite to the surface provided with the porous solid electrolyte portion, to produce a first all-solid-state cell.

As shown in FIG. 19B, a counter electrode such as a metal film 64 is formed on the surface of the first solid electrolyte structure 24, opposite to the surface provided with the porous solid electrolyte portion 28. The counter electrode may be formed by applying a cell active material 62. At this stage, the production of a first all-solid-state cell 66 is completed. The counter electrode is a positive electrode when a negative electrode is formed on the porous solid electrolyte portion 28 side, and the counter electrode is a negative electrode when a positive electrode is formed on the porous solid electrolyte portion 28 side.

The eighth production method will be described with reference to FIG. 20. The third solid electrolyte structure 42 or the sixth solid electrolyte structure 60 is used in the eighth production method. The third solid electrolyte structure 42 is used in the following description.

Figure 20:
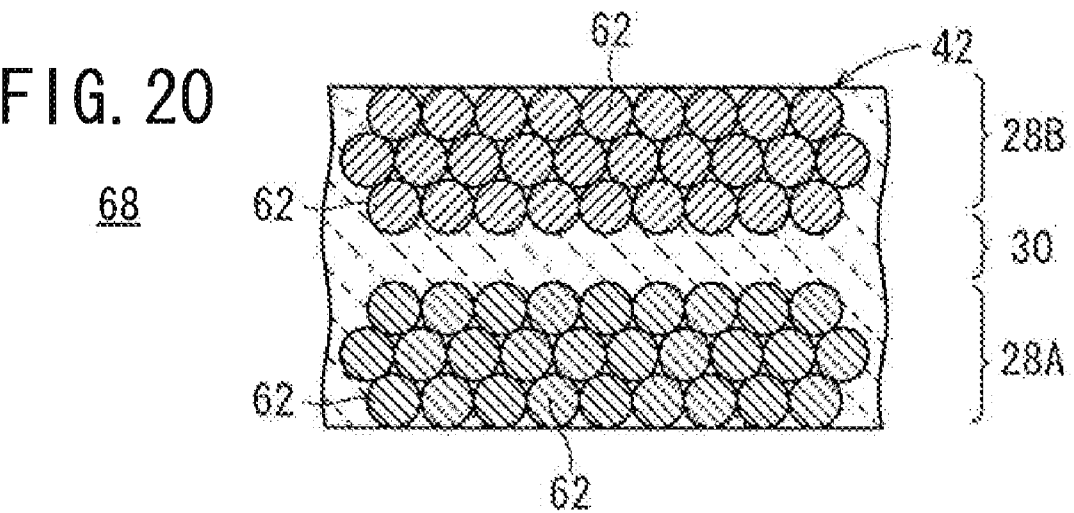
FIG. 20 is a view showing the step of filling pores in first and second porous solid electrolyte portions of the third solid electrolyte structure with a cell active material to produce a second all-solid-state cell.

As shown in FIG. 20, the first porous solid electrolyte portion 28A and the second porous solid electrolyte portion 28B of the third solid electrolyte structure 42 are filled with a cell active material 62. At this stage, the production of a second all-solid-state cell 68 is completed. The step of filling with the cell active material 62 in the eighth production method is equal to that in the seventh production method, and therefore duplicate explanations therefor are omitted.

As described above, the first solid electrolyte structure 24 produced by the first production method, the second solid electrolyte structure 34 produced by the second production method, the fourth solid electrolyte structure 52 produced by the fourth production method, or the fifth solid electrolyte structure 56 produced by the fifth production method is used in the seventh production method, and the third solid electrolyte structure 42 produced by the third production method or the sixth solid electrolyte structure 60 produced by the sixth production method is used in the eighth production method. Thus, the seventh and eighth production methods have the following advantageous effects.

(a) An additional process of connecting a solid electrolyte to the porous solid electrolyte portion of the composite electrode by pressurization, sintering, etc. is not required, whereby the production steps can be simplified and reduced.

(b) Since the above additional connecting process is not required, it is not necessary to use the solid electrolyte difficult to handle, and the number of processes of handling the solid electrolyte can be reduced.

First Example

First Example of a first solid electrolyte structure 24 (see FIG. 3B) produced by the first production method will be described in detail below with reference to FIG. 1.

Figure 21:
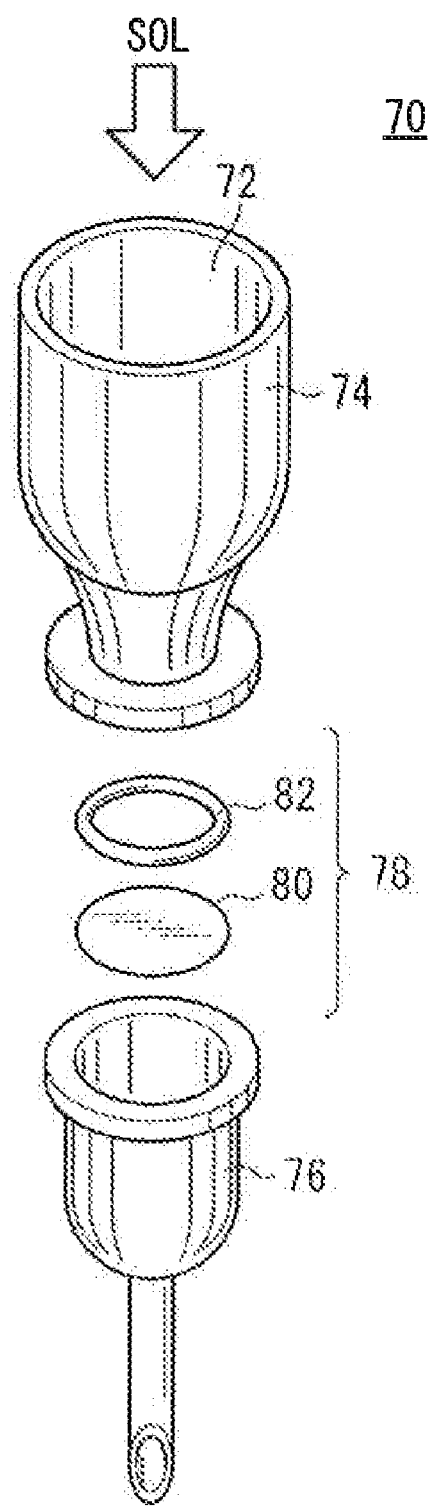
FIG. 21 is an exploded perspective view showing a filtration unit used in Examples.

In First Example, a filtering unit 70 shown in FIG. 21 is used. In the filtering unit 70, a cylindrical solution supply 74 having a hollow portion 72 is connected to a cylindrical solution discharge nozzle 76. In the connection 78, a solution filter 80 and a packing 82 are fitted to ensure the internal airtightness. The filter 80 has a pore diameter about 1 μm. In the use of the filtration unit 70, a solution containing a mixture of particles is introduced to the solution supply 74 and aspirated through the nozzle 76 under reduced pressure, whereby the solution component is discharged and the particles remain and aggregate on the filter 80.

In First Example of the first production method, the steps S1 and S2 of FIG. 1 were carried out in one process. A solution containing 9 mg of fine LAGP particles (fine particles of a solid electrolyte $Li_{1.5}Al_{0.5}Ge_{1.5}(PO_4)_3$) having a particle diameter of approximately 0.5 μm and 5 ml of $H_2O$ was prepared, and mixed under ultrasonic irradiation. The solution was introduced to the filtration unit 70 and slowly suction-filtered at approximately 0.1 kPa. At this stage, the fine LAGP particles were deposited and aggregated on the filter 80, and thus a first fine particle aggregate layer 14 (see FIG. 2B) of the fine LAGP particles was formed.

The steps S3 to S5 of FIG. 1 were carried out in one process. A solution containing 30 mg of the fine LAGP particles, 0.27 ml of a 10% solution of a polystyrene having a particle diameter of approximately 3 μm, 0.1 ml of a polyethylene glycol having a molecular weight of 400, and 5 ml of $H_2O$ was prepared and mixed under ultrasonic irradiation. The solution was introduced to the filtration unit 70 and slowly suction-filtered at approximately 0.1 kPa. At this stage, a second fine particle aggregate layer 20 (see FIG. 3A) containing the fine solid electrolyte particles and the polymer particles 16 was deposited on the first fine particle aggregate layer 14, and thus a first structure precursor 22 was formed on the filter 80.

Figure 22:
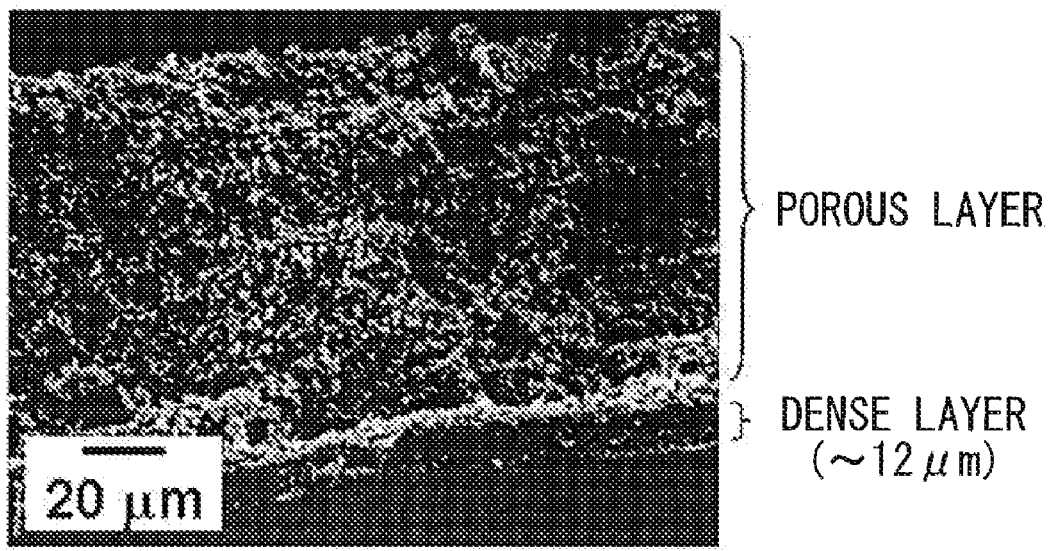
FIG. 22 is a photograph showing a cross section of a first solid electrolyte structure produced in First Example.

Then, the step S6 of FIG. 1 was carried out. The first structure precursor 22 was dried on the filter 80 at the room temperature, separated from the filter 80, heated at 200° C./hour, and maintained at 800° C. for 5 hours, to produce a first solid electrolyte structure 24 (see FIG. 3B) containing a porous solid electrolyte portion 28 and a dense solid electrolyte portion 30 integrated. A photograph of a cross section of the first solid electrolyte structure 24 is shown in FIG. 22. In FIG. 22, the porous layer corresponds to the porous solid electrolyte portion 28, and the dense layer corresponds to the dense solid electrolyte portion 30.

Second Example

Second Example of a third solid electrolyte structure 42 (see FIG. 10B) produced by the third production method will be described in detail below with reference to FIG. 7. Also in Second Example, the filtering unit 70 shown in FIG. 21 is used.

In Second Example of the third production method, the steps S201 to S203 of FIG. 7 were carried out in one process. A solution containing 30 mg of fine LAGP particles having a particle diameter of approximately 0.5 μm, 0.27 ml of a 10% solution of a polystyrene having a particle diameter of approximately 3 μm, 0.1 ml of a polyethylene glycol having a molecular weight of 400, and 5 ml of $H_2O$ was prepared, and mixed under ultrasonic irradiation. The solution was introduced to the filtration unit 70 and slowly suction-filtered at approximately 0.1 kPa. At this stage, a first fine particle aggregate layer 14 containing the fine solid electrolyte particles and the polymer particles 16 was deposited on the filter 80.

The steps S204 and S205 of FIG. 7 were carried out in one process. A solution containing 9 mg of fine LAGP particles having a particle diameter of approximately 0.5 μm and 5 ml of $H_2O$ was prepared, and mixed under ultrasonic irradiation. The solution was introduced to the filtration unit 70 and slowly suction-filtered at approximately 0.1 kPa. At this stage, a second fine particle aggregate layer 20 containing the fine solid electrolyte particles was deposited on the first fine particle aggregate layer 14.

The steps S206 to S208 of FIG. 7 were carried out in one process. A solution containing 30 mg of fine LAGP particles having a particle diameter of approximately 0.5 μm, 0.27 ml of a 10% solution of a polystyrene having a particle diameter of approximately 3 μm, 0.1 ml of a polyethylene glycol having a molecular weight of 400, and 5 ml of $H_2O$ was prepared and mixed under ultrasonic irradiation. The solution was introduced to the filtration unit 70 and slowly suction-filtered at approximately 0.1 kPa. At this stage, a third fine particle aggregate layer 38 containing the fine solid electrolyte particles and the polymer particles 16 was deposited on the second fine particle aggregate layer 20, and thus a third structure precursor 40 (see FIG. 10A) was formed on the filter 80.

Figure 23:
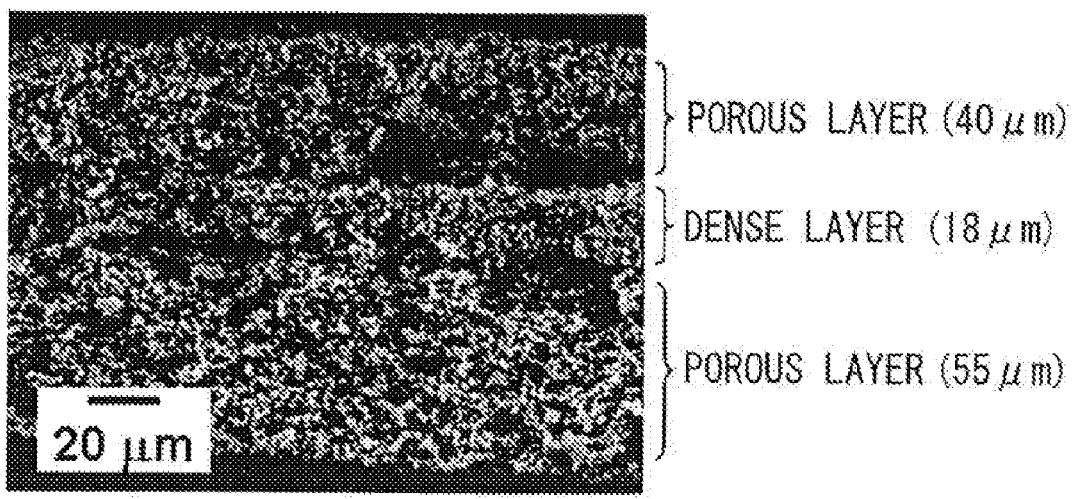
FIG. 23 is a photograph showing a cross section of a third solid electrolyte structure produced in Second Example.

Then, the step S209 of FIG. 7 was carried out. The third structure precursor 40 was dried on the filter 80 at the room temperature, separated from the filter 80, heated at 200° C./hour, and maintained at 800° C. for 5 hours, to produce a third solid electrolyte structure 42 (see FIG. 10B) containing a first porous solid electrolyte portion 28A, a dense solid electrolyte portion 30, and a second porous solid electrolyte portion 28B integrated. A photograph of a cross section of the third solid electrolyte structure 42 is shown in FIG. 23. In FIG. 23, the 55-μm-thick porous layer corresponds to the first porous solid electrolyte portion 28A, the 18-μm-dense layer corresponds to the dense solid electrolyte portion 30, and the 40-μm-thick porous layer corresponds to the second porous solid electrolyte portion 28B.

In First and Second Examples, the first structure precursor 22 and the third structure precursor 40 were produced on the filtration unit 70 shown in FIG. 21, so that each fine particle aggregate layer could be formed in one process, and the production could be effectively simplified.

Third Example

Third Example of a sixth solid electrolyte structure 60 (see FIG. 18B) produced by the sixth production method will be described in detail below with reference to FIG. 16. Also in Third Example, the filtering unit 70 shown in FIG. 21 is used.

In Third Example of the sixth production method, the steps S501 to S503 of FIG. 16 were carried out in one process. A solution containing 0.20 ml of a 10% solution of a polystyrene having a particle diameter of approximately 3 μm (available from MAGSPHERE INC.) and 20 ml of $H_2O$ was prepared, and mixed under ultrasonic irradiation. The solution was introduced to the filtration unit 70 and slowly suction-filtered at approximately 5 kPa. At this stage, an opal-type polystyrene crystal structure was deposited on the filter 80. The deposited polystyrene structure was separated from the filter 80 and maintained at 110° C. for 1 hour to fuse the polystyrene particles, whereby an opal-type polystyrene crystal structure film (see FIG. 17A) was prepared as a template for a porous layer. Two films of the porous layer templates were prepared in this manner, and stacked with a nonwoven fabric 44 (available from Asahi Kasei Corporation) for a dense layer sandwiched therebetween, to prepare a template for a sixth solid electrolyte structure 60 (see FIG. 17C).

Figure 24:
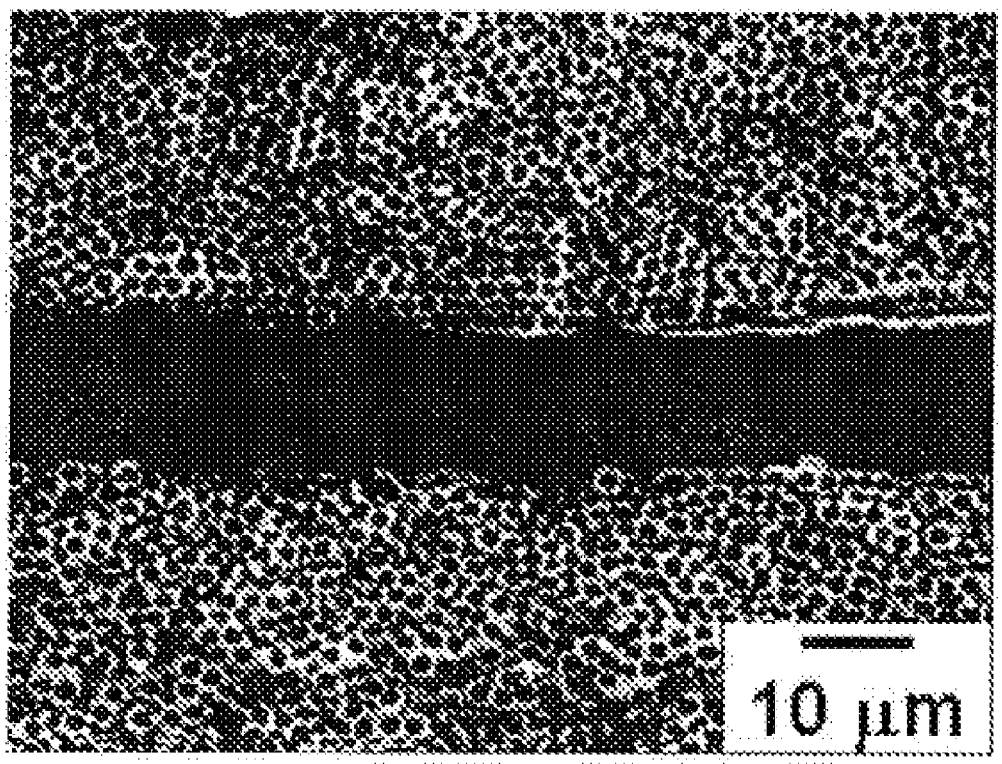
FIG. 24 is a photograph showing a cross section of a sixth solid electrolyte structure produced in Third Example.

Then, in the steps S504 and S505 of FIG. 16, the template for the sixth solid electrolyte structure 60 was vacuum-impregnated under reduced pressure with a precursor sol solution 46 prepared by mixing 0.23 g of $CH_3COOLi$, 1.89 g of $La(CH_3COO)_3 \cdot 1.5H_2O$, 2.84 g of $Ti(OCH(CH_3)_2)_4$, 25.2 g of $H_2O$, 6.00 g of $CH_3COOH$, and 12.02 g of $(CH_3)_2CHOH$, to produce a sixth structure precursor 58 shown in FIG. 18A. The sixth structure precursor 58 was dried under reduced pressure at the room temperature, heated at 10° C./min, and maintained at 450° C. for 1 hour to remove the template polystyrene, and further maintained at 1,000° C. for 1 hour, to produce the sixth solid electrolyte structure 60 (see FIG. 18B) containing a first porous solid electrolyte portion 28A, a dense solid electrolyte portion 30, and a second porous solid electrolyte portion 28B integrated by sintering. A photograph of a cross section of the sixth solid electrolyte structure 60 is shown in FIG. 24. In FIG. 24, the lower porous layer corresponds to the first porous solid electrolyte portion 28A, the middle dense layer corresponds to the dense solid electrolyte portion 30, and the upper porous layer corresponds to the second porous solid electrolyte portion 28B.

Fourth Example

Fourth Example of a first solid electrolyte structure 24 (see FIG. 3B) produced by the first production method using different materials will be described below. Also in Fourth Example, the filtering unit 70 shown in FIG. 21 is used.

In Fourth Example, fine LLZ particles (particles of an aluminum-containing ceramic material having a garnet-type or garnet-like-type crystal structure containing lithium, lanthanum, zirconium, and oxygen) having a particle diameter of approximately 1 μm were used as fine solid electrolyte particles. A solution containing 20 mg of the fine LLZ particles and 30 ml of EtOH was prepared, and mixed under ultrasonic irradiation. The solution was introduced to the filtration unit 70 and slowly suction-filtered at approximately $1.0 \times 10^{-1}$ kPa. At this stage, the fine LLZ particles were deposited and aggregated on the filter 80, and thus a first fine particle aggregate layer 14 (see FIG. 2B) of the fine LLZ particles was formed.

A solution containing 30 mg of fine LLZ particles, $2.0 \times 10^{-1}$ ml of a 10% solution of a polystyrene having a particle diameter of approximately 3 μm, and 30 ml of EtOH was prepared, and mixed under ultrasonic irradiation. The solution was introduced to the filtration unit 70 and slowly suction-filtered at approximately $1.0 \times 10^{-1}$ kPa. At this stage, a second fine particle aggregate layer 20 (see FIG. 3A) containing the fine solid electrolyte particles and the polymer particles 16 was deposited on the first fine particle aggregate layer 14, and thus a first structure precursor 22 was formed on the filter 80.

Figure 25:
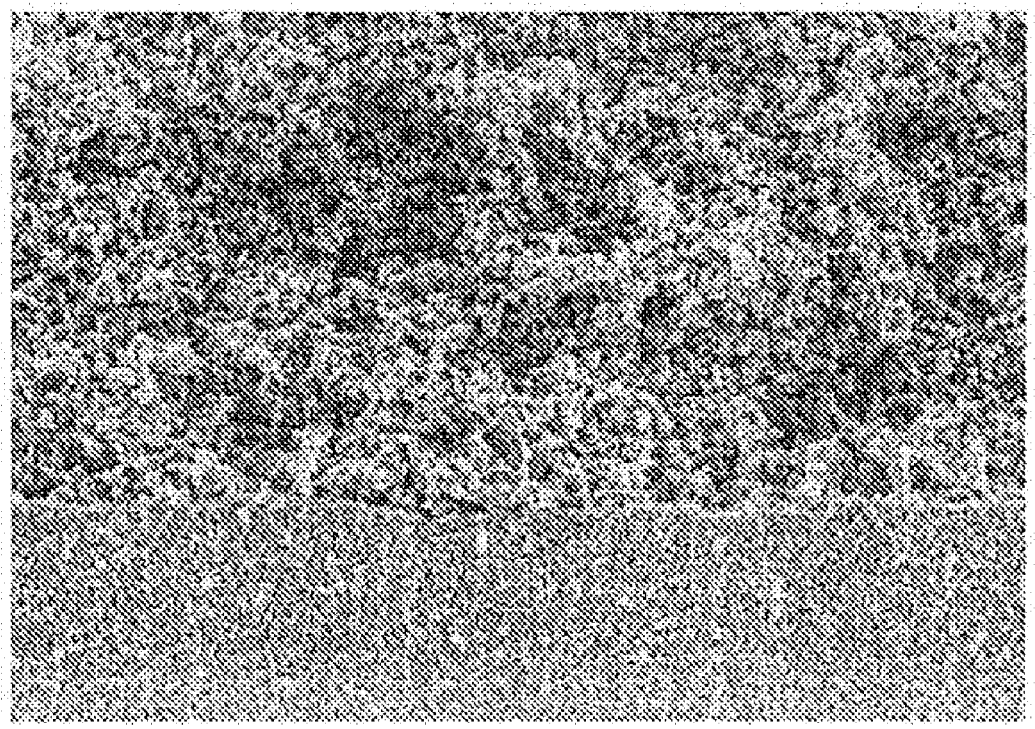
FIG. 25 is a photograph showing a cross section of a first solid electrolyte structure produced in Fourth Example.

Twenty samples of the first structure precursors 22 were formed in the above manner, and were dried on the filter 80 at the room temperature respectively. Among them, ten samples were each separated from the filter 80. The other ten samples were each separated from the filter 80 and then pressurized at 60 MPa for 5 minutes. Then, each sample was heated to 1125° C. in one hour and maintained at 1125° C. for 6 hours to produce a first solid electrolyte structure 24 (see FIG. 3B) containing a porous solid electrolyte portion 28 and a dense solid electrolyte portion 30 integrated. As a result, nine samples among the not pressurized ten samples were broken, whereas only two samples among the pressurized ten samples were broken. This result suggested that the breakage of the solid electrolyte structure could be prevented by carrying out the pressurization before the sintering for removing the polymer particles in the structure production process. A photograph of a cross section of the first solid electrolyte structure 24 of Fourth Example is shown in FIG. 25. In FIG. 25, the porous layer corresponds to the porous solid electrolyte portion 28, and the dense layer corresponds to the dense solid electrolyte portion 30.

It is to be understood that the solid electrolyte structure production method, the all-solid-state cell production method, the solid electrolyte structure, and the all-solid-state cell of the present invention are not limited to the above embodiment, and various changes and modifications may be made therein without departing from the scope of the invention.

What is claimed is:

1. A method for producing a solid electrolyte structure, the method comprising:
    a precursor preparation process of preparing a structure precursor; and
    a structure production process of sintering the structure precursor to produce the solid electrolyte structure;
    wherein the precursor preparation process comprises a first dispersing step of dispersing fine particles of a solid electrolyte in a solvent to form a first solution, a first depositing step of depositing a first layer containing aggregated fine particles of a solid electrolyte by drying the first solution, a second dispersing step of dispersing fine particles of the solid electrolyte in a solvent to form a second solution, and a second depositing step of depositing a second layer containing polymer particles and aggregated fine particles of the solid electrolyte by drying the second solution, wherein while the second solution is dried, the polymer particles are immersed therein;
    wherein the first solution is deposited on the second layer or the second solution is deposited on the first layer; and
    wherein the structure production process comprises a step of sintering the structure precursor, thereby removing the polymer particles to produce the solid electrolyte structure having a porous solid electrolyte portion and a dense solid electrolyte portion in an integrated state.

2. The method according to claim 1, wherein in the precursor preparation process, the first depositing step is performed and thereafter the second depositing step is performed;
    wherein the first depositing step comprises depositing the first solution on a substrate and thereafter drying the first solution to deposit the first layer; and
    wherein the second depositing step comprises depositing the polymer particles on the first layer, filling gaps between the polymer particles with the second solution so the polymer particles are immersed in the second solution, and thereafter drying the second solution to deposit the second layer;
    whereby the structure precursor is produced having the second layer stacked on the first layer.

3. The method according to claim 1, wherein in the precursor preparation process, the second depositing step is performed, and thereafter the first depositing step is performed;
    wherein the second depositing step comprises depositing the polymer particles on a substrate, filling gaps between the polymer particles with the second solution so the polymer particles are immersed in the second solution, and thereafter drying the second solution to deposit the second layer; and
    wherein the first depositing step comprises depositing the first solution on the second layer, and thereafter drying the first solution to deposit the first layer;
    whereby the structure precursor is produced having the first layer stacked on the second layer.

4. The method according to claim 1, wherein in the precursor preparation process, the second depositing step is performed before the first depositing step as a primary second depositing step and again following the first depositing step as an additional second depositing step;
    wherein the primary second depositing step comprises depositing the polymer particles on a substrate, filling gaps between the polymer particles with the second solution so the polymer particles are immersed in the second solution, and thereafter drying the second solution to deposit a primary second layer;
    wherein the first depositing step comprises depositing the first solution on the primary second layer, and thereafter drying the first solution to deposit the first layer; and
    wherein the additional second depositing step comprises depositing the polymer particles on the first layer, filling gaps between the polymer particles with a further second solution so the polymer particles are immersed in the further second solution, and thereafter drying the further second solution to deposit an additional second layer;
    whereby the structure precursor is produced having the first layer stacked on the primary second layer and the additional second layer stacked on the first layer.

5. The method according to claim 1, wherein the polymer particles comprise a polystyrene or a polymethyl methacrylate (PMMA).

6. A method according to claim 1, wherein the solid electrolyte comprises an LAGP material having a formula of $Li_{1+x}Al_xGe_{2-x}(PO_4)_3$, wherein $0 \leq x \leq 1$, an LATP material having a formula of $Li_{1+x}Al_xTi_{2-x}(PO_4)_3$, wherein $0 \leq x \leq 1$, an LLT material having a formula of $Li_{3x}La_{2/3-x}TiO_3$, wherein $0 \leq x \leq 2/3$, or an aluminum containing ceramic material having a garnet-type crystal structure containing lithium, lanthanum, zirconium, and oxygen.

7. The method according to claim 1, wherein in the structure production process, a pressure is applied to the structure precursor.

8. A method for producing an all-solid-state cell, comprising the steps of filling the porous solid electrolyte portion of the solid electrolyte structure produced by the method according to claim 1 with a cell active material, and forming a counter electrode on the surface of the solid electrolyte structure, opposite to the surface provided with the porous solid electrolyte portion, to produce the all-solid-state cell.

9. A method for producing an all-solid-state cell, comprising the step of filling the porous solid electrolyte portion of the solid electrolyte structure produced by the method according to claim 1 with a cell active material to produce the all-solid-state cell.

* * * * *